(12) United States Patent
Luck

(10) Patent No.: US 10,605,488 B1
(45) Date of Patent: *Mar. 31, 2020

(54) HEAT TRANSFER DEVICE FOR SOLAR HEATING

(71) Applicant: John Howard Luck, Tecumseh, Ontario (CA)

(72) Inventor: John Howard Luck, Tecumseh (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/371,617

(22) Filed: Apr. 1, 2019

(51) Int. Cl.
*F24S 20/66* (2018.01)
*F24S 10/30* (2018.01)
*F24S 60/00* (2018.01)
*F24S 80/00* (2018.01)

(52) U.S. Cl.
CPC ............. *F24S 20/66* (2018.05); *F24S 60/00* (2018.05); *F24S 10/30* (2018.05); *F24S 2080/012* (2018.05)

(58) Field of Classification Search
CPC .. F24S 20/66; F24S 10/30; F24S 10/90; F24S 60/30; F24J 2/04; F28D 15/02; F28D 15/043
USPC ........................................................ 126/617
See application file for complete search history.

(56) References Cited

U.S. PATENT DOCUMENTS

| | | | | |
|---|---|---|---|---|
| 4,000,851 A * | 1/1977 | Heilemann | ........... | F24D 11/003 126/587 |
| 4,147,300 A * | 4/1979 | Milburn, Jr. | .......... | F24D 11/007 126/613 |
| 4,164,933 A * | 8/1979 | Alosi | ........ | F24D 3/14 126/621 |
| 4,183,350 A * | 1/1980 | Staudacher | ............. | E04C 2/525 126/633 |
| 4,273,106 A * | 6/1981 | Gould | ..................... | F24S 20/69 126/622 |
| 4,285,332 A * | 8/1981 | McHugh | ................. | F24D 3/005 126/632 |
| 4,296,798 A * | 10/1981 | Schramm | .................. | E04B 1/74 165/56 |
| 4,474,168 A * | 10/1984 | Pettit | ..................... | E04H 4/0018 126/563 |
| 6,079,170 A * | 6/2000 | Slebos | .................... | F24D 3/125 52/220.1 |
| 6,109,258 A * | 8/2000 | Rylewski | ................ | F24S 20/66 126/702 |
| 6,220,339 B1 * | 4/2001 | Krecke | ................. | F24D 11/003 165/48.2 |
| 6,860,322 B1 * | 3/2005 | Rylewski | ................ | F24S 20/66 165/104.28 |
| 10,288,318 B2 * | 5/2019 | Luck | ....................... | F24S 10/90 |
| 2007/0220903 A1 * | 9/2007 | Watanabe | ................. | F25B 9/10 62/6 |
| 2013/0255301 A1 * | 10/2013 | Correa | .................... | F25D 21/14 62/291 |

(Continued)

FOREIGN PATENT DOCUMENTS

EP          0473859 A1 * 3/1992 ................. F24J 2/04

*Primary Examiner* — Edelmira Bosques
*Assistant Examiner* — Nikhil P Mashruwala

(57) ABSTRACT

A method for improving the efficiency of a solar heating system based on absorbing heat from solar radiation into the outer surface of a concrete wall. The heat transfer device makes use of a fluid in a tube system to transfer heat from the outside of the wall to the inside of the wall. The inside wall is then used to heat air that is passed over it, and that air is then used to heat up a heat storage system.

9 Claims, 30 Drawing Sheets

(56) References Cited

U.S. PATENT DOCUMENTS

| | | | |
|---|---|---|---|
| 2014/0020676 A1* | 1/2014 | Wehner | G05D 23/1346 |
| | | | 126/663 |
| 2014/0283540 A1* | 9/2014 | Leman | F24H 4/04 |
| | | | 62/238.6 |
| 2019/0285354 A1* | 9/2019 | Machida | H01L 23/3736 |

* cited by examiner

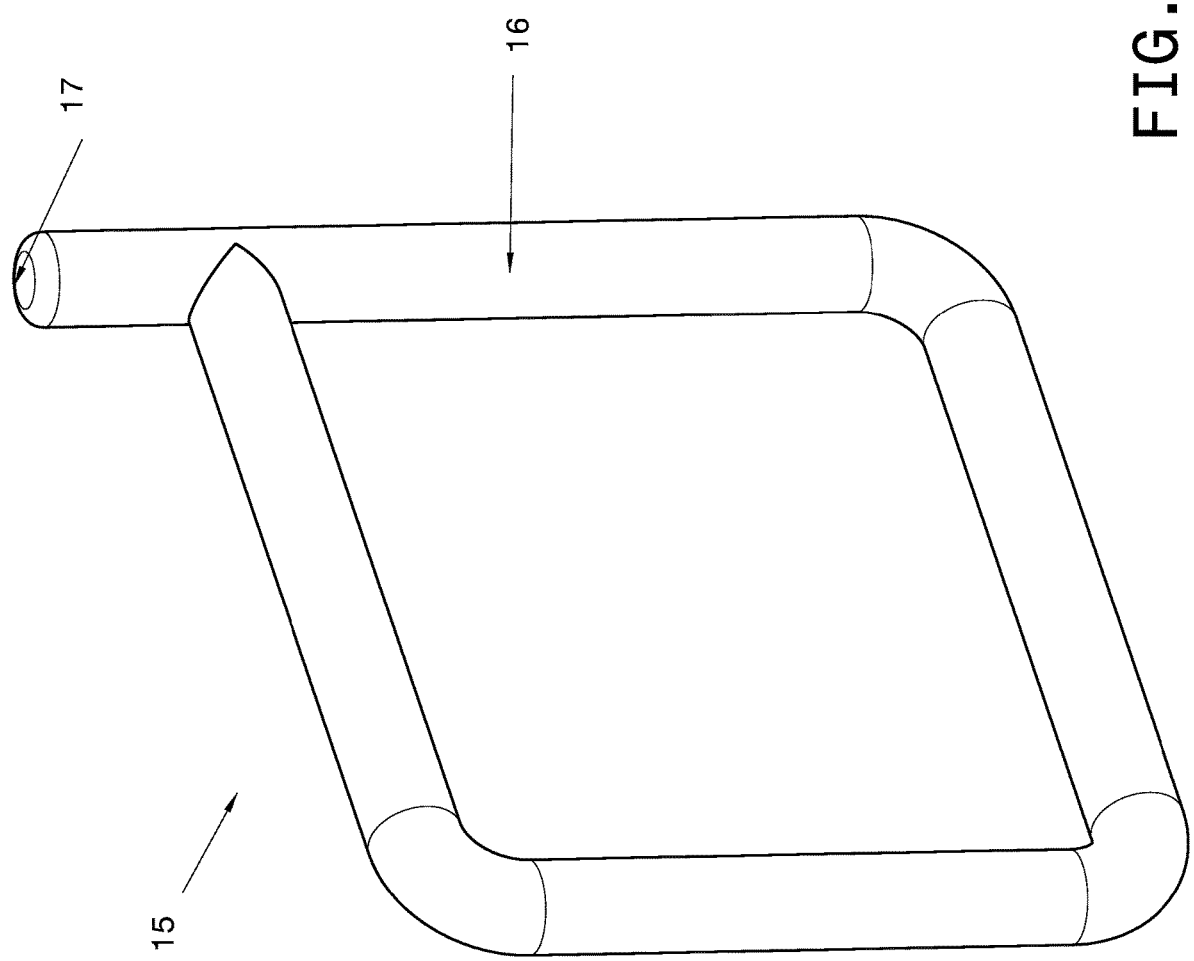

US 10,605,488 B1

HEAT TRANSFER DEVICE FOR SOLAR HEATING

BACKGROUND OF THE INVENTION

The present invention relates to the field of solar heating. Solar heating using heat transfer through an outside wall has been used in the past. Traditionally the amount of heat and rate of heat transfer has been limited by the thickness of the wall and the thermal coefficient of heat transfer in concrete. Unfortunately, concrete is not a great heat transfer medium, therefor the ability of these systems to create significant heating ability is limited.

SUMMARY OF THE INVENTION

It is the object of this invention to provide a method to improve the rate and quantity of heat transfer through a wall that has solar energy falling on its outer surface. This invention discloses a method of improving the rate and quantity of heat transferred through a concrete wall, through the use of a fluid based heat transfer device. This device is located in the concrete wall and for the purpose of ease of use, the heat transfer device is located inside a heat transfer block also made of concrete. These heat transfer blocks can be used to construct a block wall or can be located inside a poured concrete wall, with their location maintained during the pouring of the wall by the use of a support structure made from re-bar or some other metal construct.

The heat transfer device consists of two vertical tubes and two horizontal connecting tubes that form a complete loop. The vertical tube near the heated surface, absorbs heat, becoming less dense and therefore the fluid rises in the tube and passes into the upper horizontal tube and then into the rear vertical tube where it transfers heat to the cooler wall, becoming denser and therefor descending and passing into the lower horizontal tube and back to the front vertical tube to repeat the cycle. This continuous cycle provides a steady movement of heat through the concrete wall. This concept can also be adapted to a coil shaped tube so that the fluid repeatedly passes from the front absorbing heat to the rear delivering heat.

There is another version of the heat transfer device, which has the heat absorbing portion of the heat transfer device at an angle to the vertical. This allows the heat transfer device to be optimized such that the sun light striking the outside of the wall is normal to the surface of the wall. The value of the angle required to accomplish this depends upon the latitude at which the wall is located, and thereby determining the average angle of the sun in the sky during the cold months of the year, the determined average angle is then used to set the angle of the front face of the wall in front of the heat transfer device.

The complete solar heating system consists of several of the heat transfer devices located in a cement wall with an outer protective glazing cover to retain heat and an automated screen system to reduce loss of heat and a fan/duct system that takes the heat from the inside of the wall section to a heat storage location.

BRIEF DESCRIPTION OF THE DRAWINGS

These and other objects of the invention will become apparent from reading a detailed description taken in conjunction with the drawings, in which:

FIG. 3 is a drawing showing a second version of the heat transfer device.

DETAILED DESCRIPTION

Figure 1:
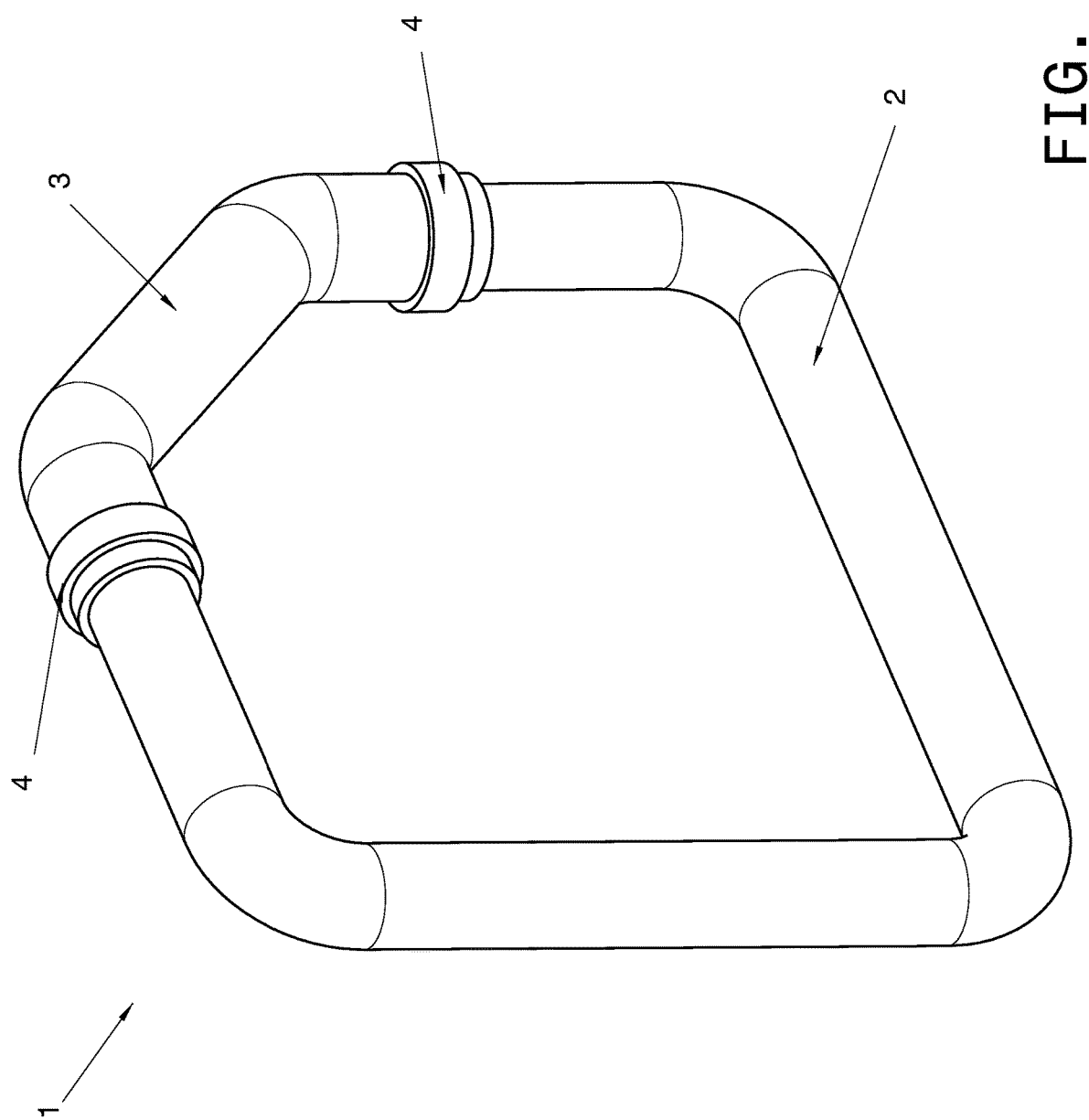
FIG. 1 is a drawing showing a first version of the heat transfer device.

With reference to FIG. 1, a first embodiment of a heat transfer device, 1, is shown. The major components are: a metal tube, 2, a flexible tube, 3, attached to the metal tube, 2, through the use of crimp type compression rings, 4. The metal tube, 2, can be made from metals such as steel, aluminum, copper, brass, etc., while the flexible tube, 3, can be made from several deformable plastics such as Poly vinyl chloride, Nylon, Acetals, Polybutadiene rubber, etc.

Figure 2:
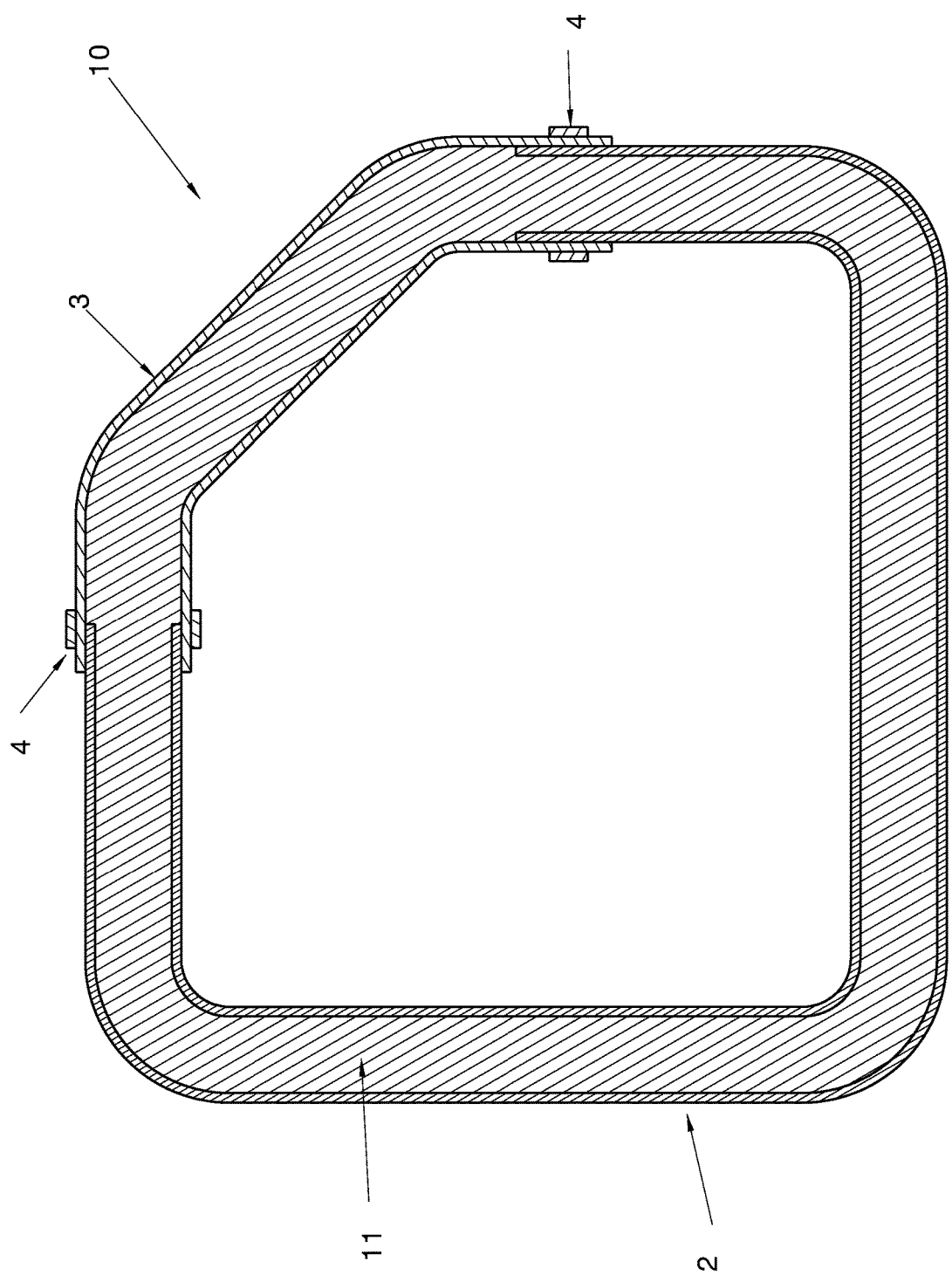
FIG. 2 is a drawing showing a cross section view through the heat transfer device of FIG. 1.

FIG. 2 shows a cross section view, 10, through the heat transfer device, 1, of FIG. 1. The components: a metal tube, 2, a flexible tube, 3, attached to the metal tube, 2, through the use of crimp type compression rings, 4, are shown as well as the fluid, 11, that fills the complete tube. The fluid, 11, is used to transfer heat from the hotter side of the metal tube, 2, to the cooler side of the tube, 2, as it circulates. The fluid may be any suitable fluid, 11, that can perform in a liquid state over the temperature range encountered during operation, which is estimated to range from −50° to +95° C. Suitable fluids, 11, include, water with antifreeze, alcohols, etc. The flexible tube, 3, allows for expansion of the fluid, 11, as the temperature of the fluid, 11, increases.

With reference to FIG. 3, a second embodiment of a heat transfer device, 15, is shown. The major components are: a metal tube formed into a loop, 16, and a metal cap, 17. The metal tube, 16, can be made from metals such as steel, aluminum, copper, brass, etc. Steel may be preferred as it has a thermal coefficient of expansion that is similar to concrete.

Figure 3A:
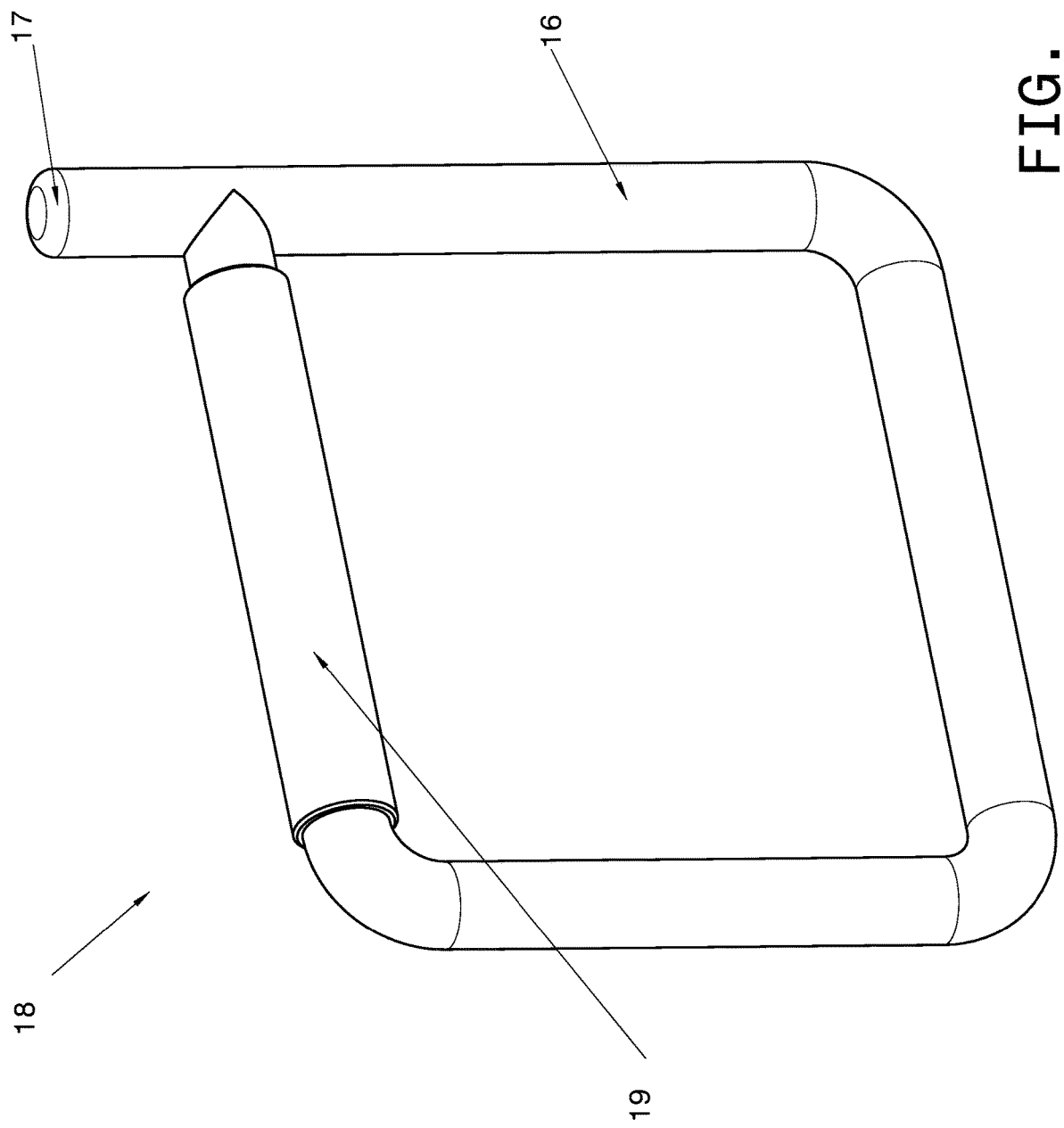
FIG. 3A is a drawing showing the second version of the heat transfer device from FIG. 3 with insulation sleeves.

With reference to FIG. 3A, the second embodiment of the heat transfer device of FIG. 3 with insulation sleeve, 19, is shown as heat transfer device, 18. The major components are: a metal tube formed into a loop, 16, a metal cap, 17, and the insulation sleeve, 19. The insulation sleeve, 19, can be made from various materials that are poor heat conductors, and are present to prevent any heat loss from the metal tube, 16, until the opposite vertical portion of the heat transfer device, 18, has been reached by the fluid inside the heat transfer device, 18.

Figure 4:
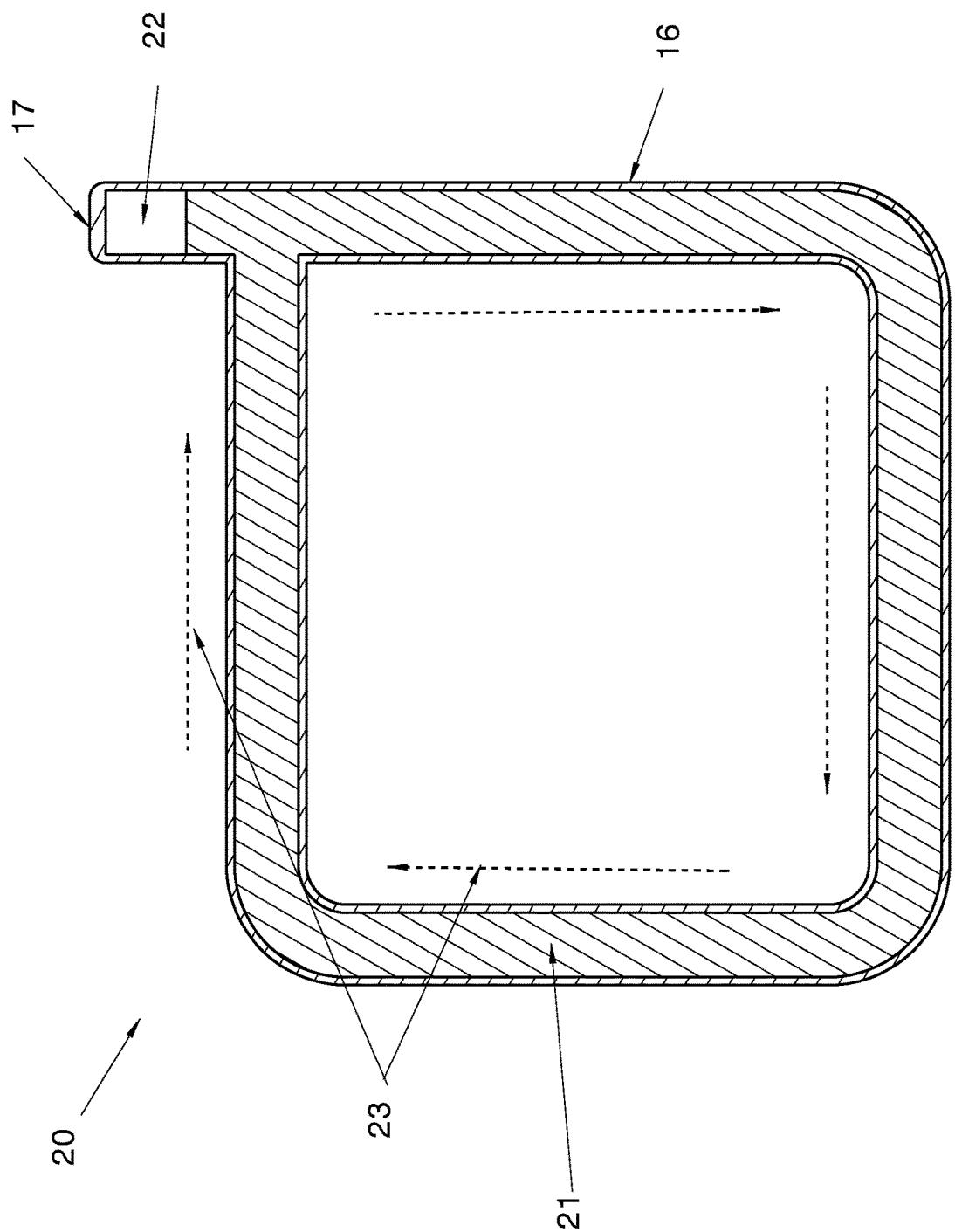
FIG. 4 is a drawing showing a cross section view through the heat transfer device of FIG. 3.

FIG. 4 shows a cross section view, 20, through the heat transfer device, 15, of FIG. 3. The components: a metal tube, 16, a metal cap, 17, also shown is the fluid, 21, that fills most of the metal tube, 16, leaving a void above the fluid, 22, that allows for expansion of the fluid, 21. The fluid may be any suitable fluid, 21, that can perform in a liquid state over the temperature range encountered during operation, which is estimated to range from −50° to +95° C. Suitable fluids, 21, include, water with antifreeze, alcohols, etc. Also shown in the figure are direction arrows, 23, showing the direction of movement of the fluid, 21, as it is heated.

Figure 5:
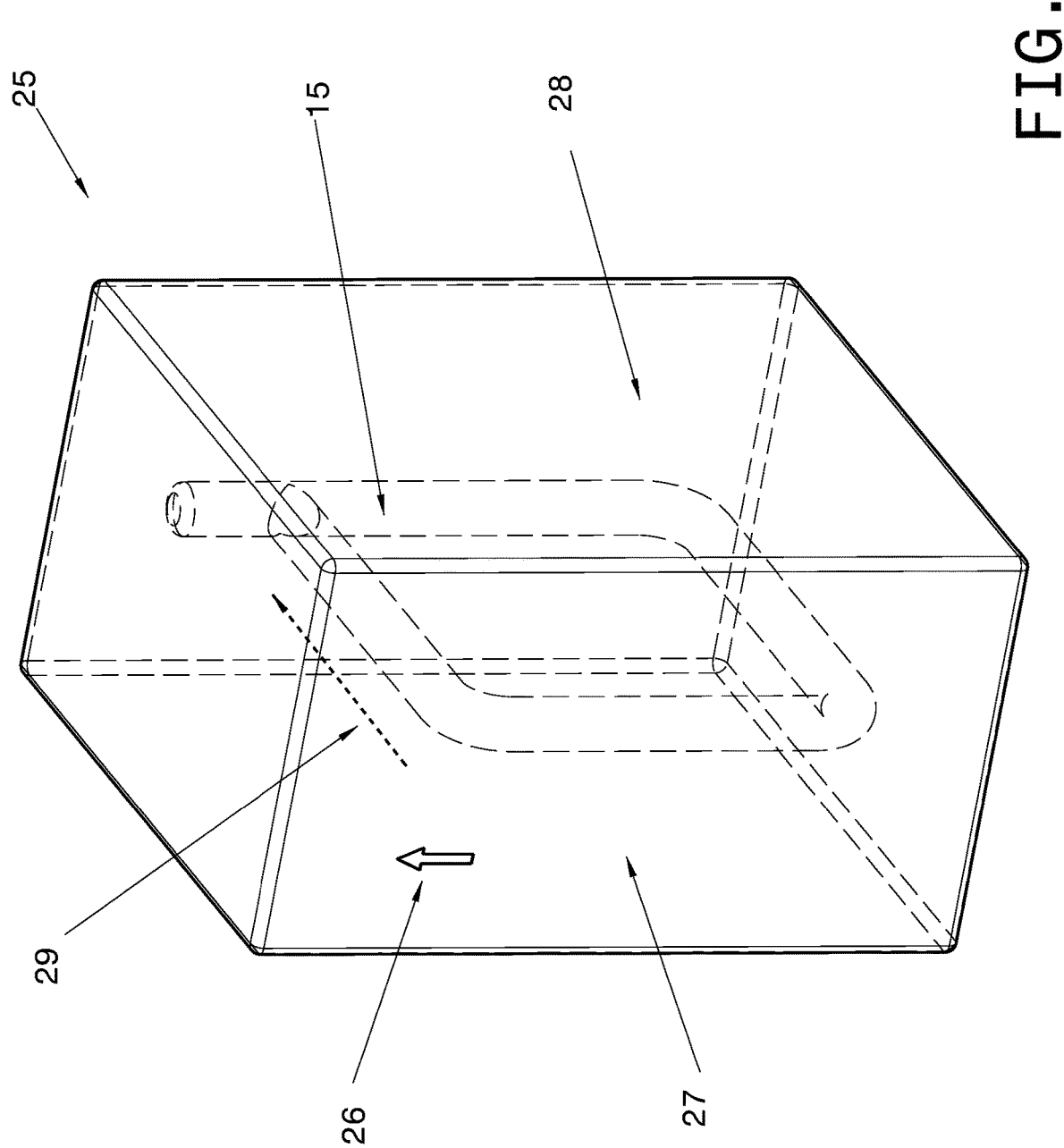
FIG. 5 is a drawing showing a heat transfer block that contains the heat transfer device of FIG. 3.

With reference to FIG. 5, the heat transfer block, 25, is shown to contain a second embodiment of the heat transfer device, 15. The heat transfer block, 25, has an arrow, 26, embossed into its surface, 27. The purpose of this arrow, 26, is first to identify the surface that must be heated, while the direction of the arrow, 26, indicates the orientation of the heat transfer block, 25, for proper operation. The face, 27, is the face of the heat transfer block, 25, is the face that must be oriented to the heat source. The material of the heat transfer block, 28, is most likely concrete, however the concrete may be filled with heat transfer efficient materials, such as iron particles. The direction of heat transfer is shown by arrow, 29.

Figure 6:
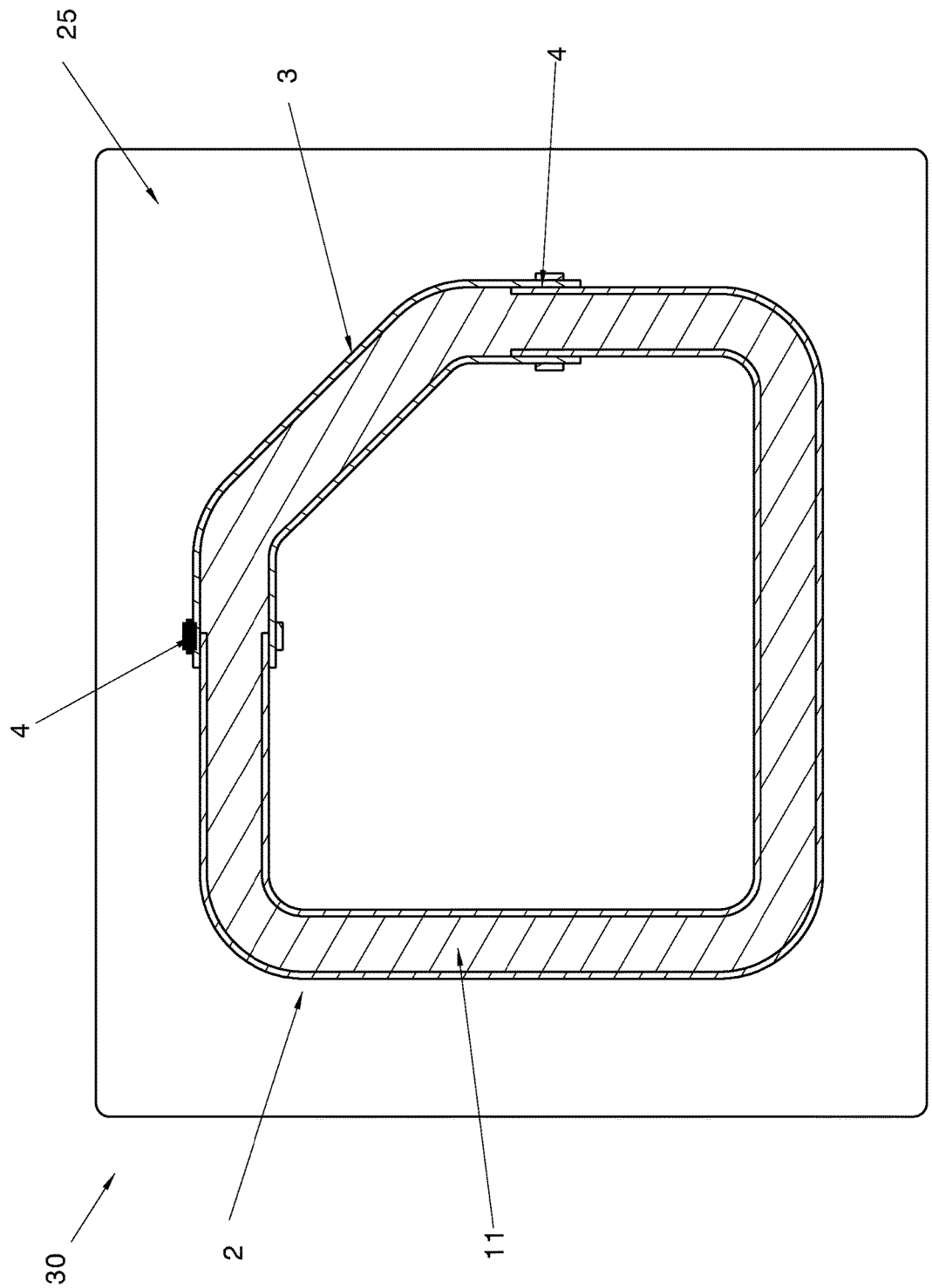
FIG. 6 is a drawing showing a cross section through a heat transfer block that contains the heat transfer device of FIG. 1.

FIG. 6 shows a cross section view, 30, thru a heat transfer block, 25, that has the heat transfer device, 1, of FIG. 1 embedded in it. Also shown in the view are the components: a metal tube, 2, a flexible tube, 3, attached to the metal tube, 2, through the use of crimp type compression rings, 4, and the fluid, 11.

Figure 7:
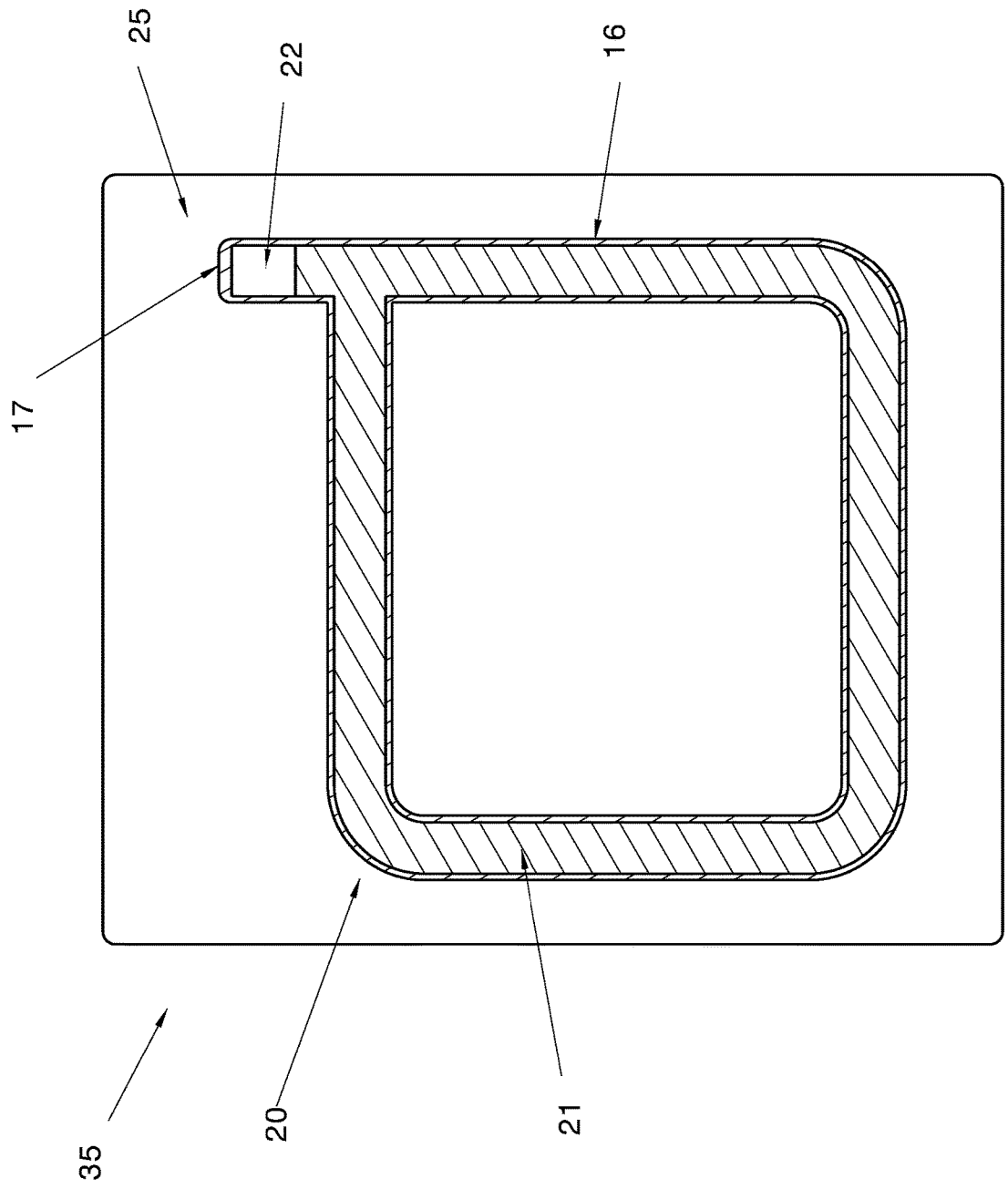
FIG. 7 is a drawing showing a cross section through a heat transfer block that contains the heat transfer device of FIG. 3.

FIG. 7 shows a cross section view, 35, thru a heat transfer block, 25, that has the heat transfer device, 15, of FIG. 3 embedded in it. Also shown in the view are the components: a metal tube, 16, a metal cap, 17, attached to the metal tube, 16, the void above the fluid, 22, and the fluid, 21.

Figure 8:
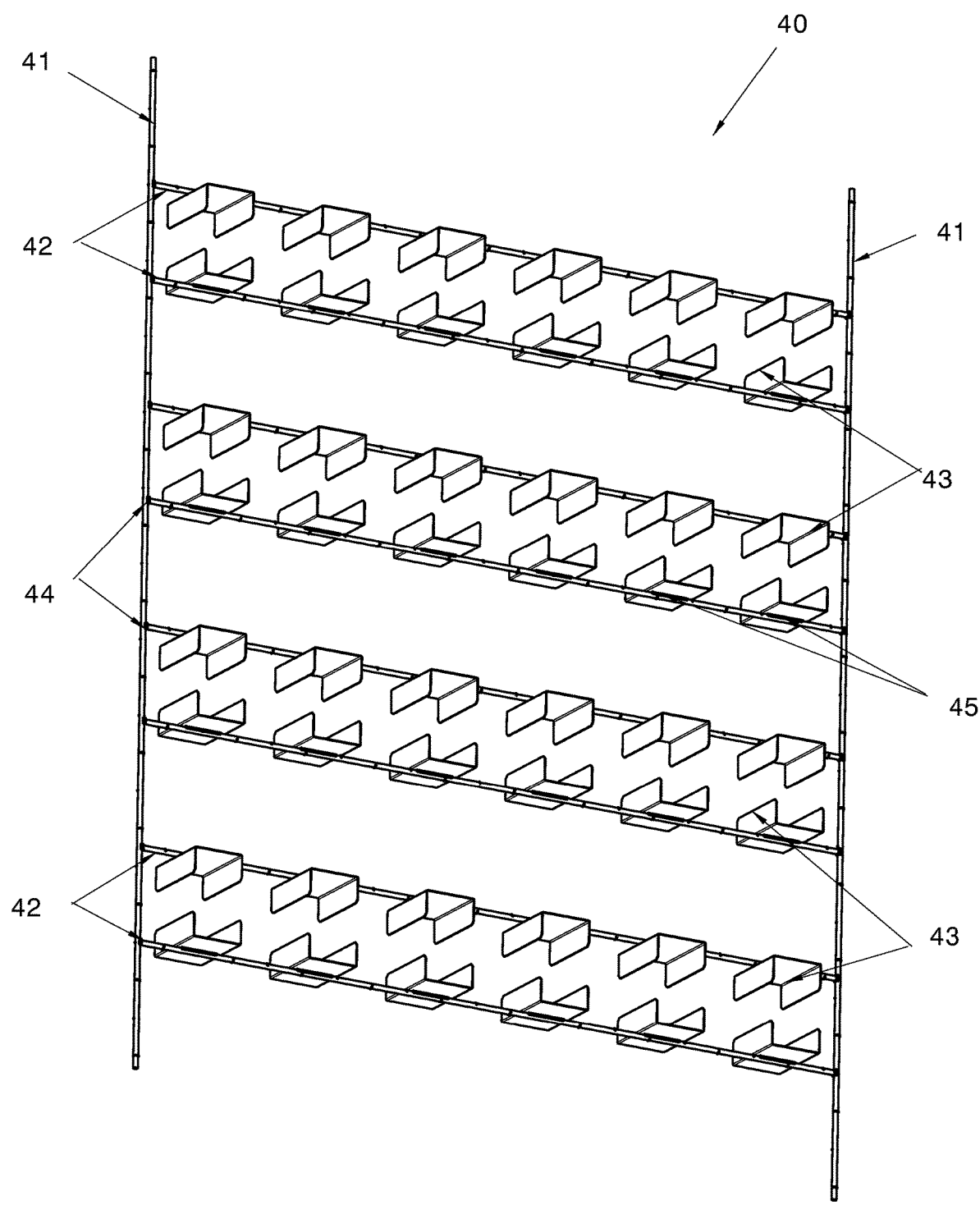
FIG. 8 is a drawing showing a rack designed to hold several heat transfer blocks in fixed locations.

With reference to FIG. 8 a metal rack, 40, is shown, that is designed to hold the heat transfer blocks, 25, in fixed positions. The metal rack is constructed from vertical re-bars, 41, and horizontal re-bars, 42, which are joined by welds, 44. The horizontal re-bars, 42, carry brackets, 43, that are attached to the horizontal re-bars, 42, by welds, 45. The arrangement of the brackets, 43, on the horizontal re-bars, 42, such that the spacing and alignment of the brackets, 43, allows the heat transfer blocks, 25, to simply slip into place supported by the brackets, 43.

Figure 9:
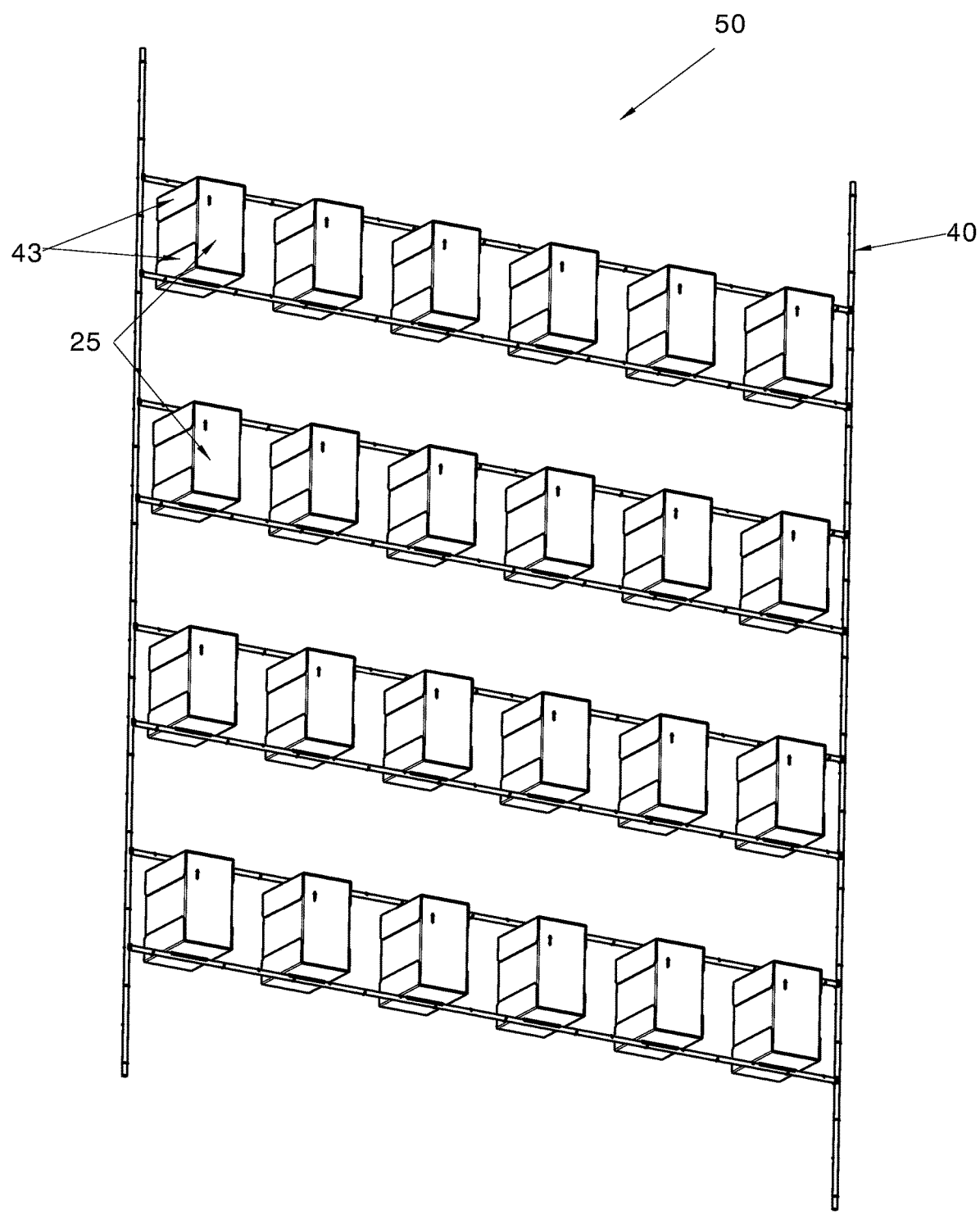
FIG. 9 is a drawing showing the rack of FIG. 8 holding several heat transfer blocks in fixed locations.

FIG. 9 shows the rack, 40, loaded with heat transfer blocks, 25, sitting on the brackets, 43, making up the loaded rack system, 50.

Figure 10:
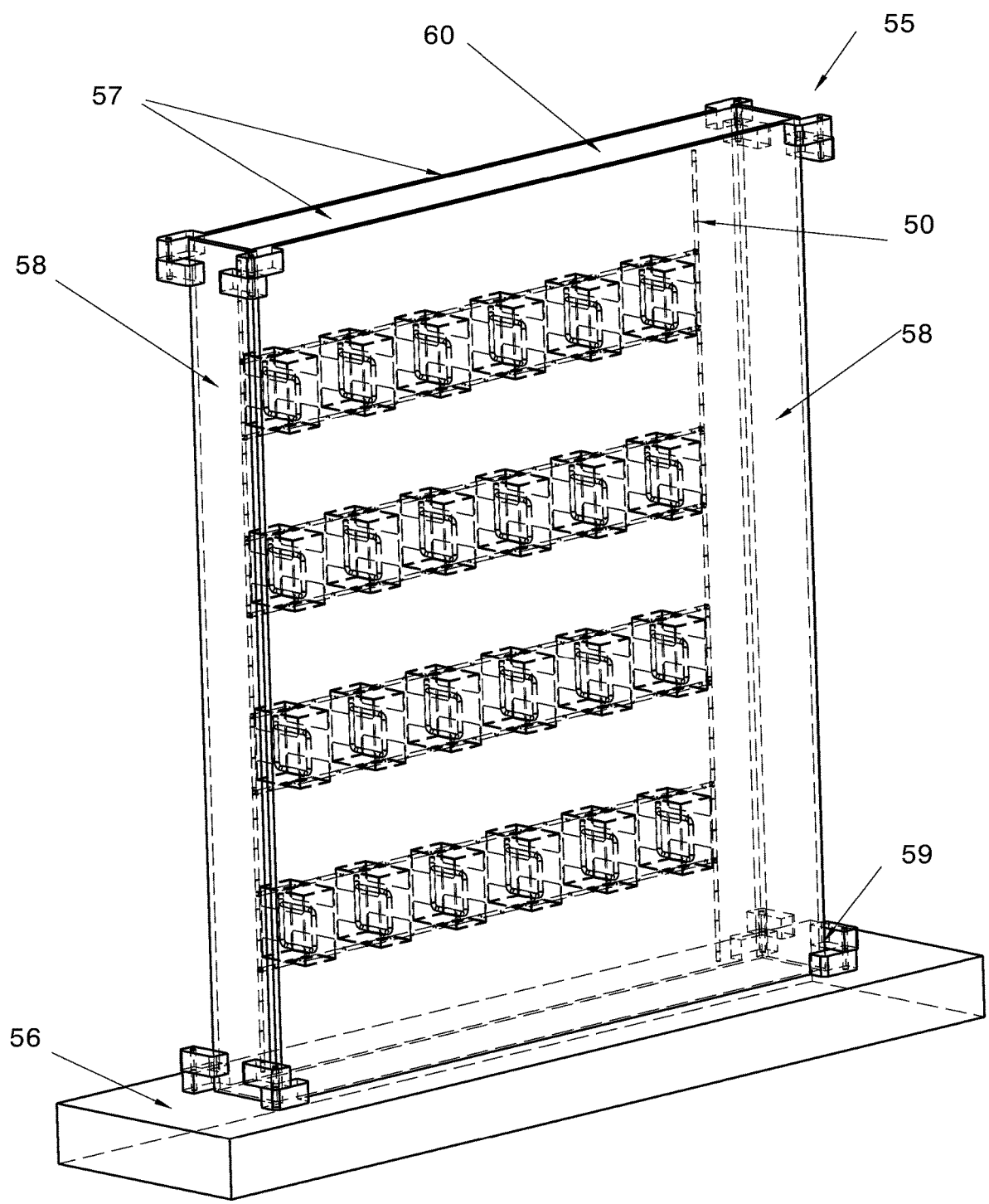
FIG. 10 is a drawing showing concrete forms sitting on a foundation that contain the assembly of FIG. 9 held in place inside the forms prior to the forms being filled with concrete.

With reference to FIG. 10 the set-up, 55, used to cast the heat transfer blocks, 25, into a wall unit is shown. The foundation, 56, serves as a base to set the front and rear forms, 57, and the side forms, 58, on. The front and rear forms, 57, and the side forms, 58, are connected through the connection hardware, 59, at several points to create the form assembly. The loaded rack system, 50, is located centrally inside the form assembly. To complete the process, concrete is poured into the form assembly, through the top opening, 60, and suitably worked and agitated to remove air bubbles from the concrete and achieve good contact between the concrete and the heat transfer blocks, 25.

Figure 11:
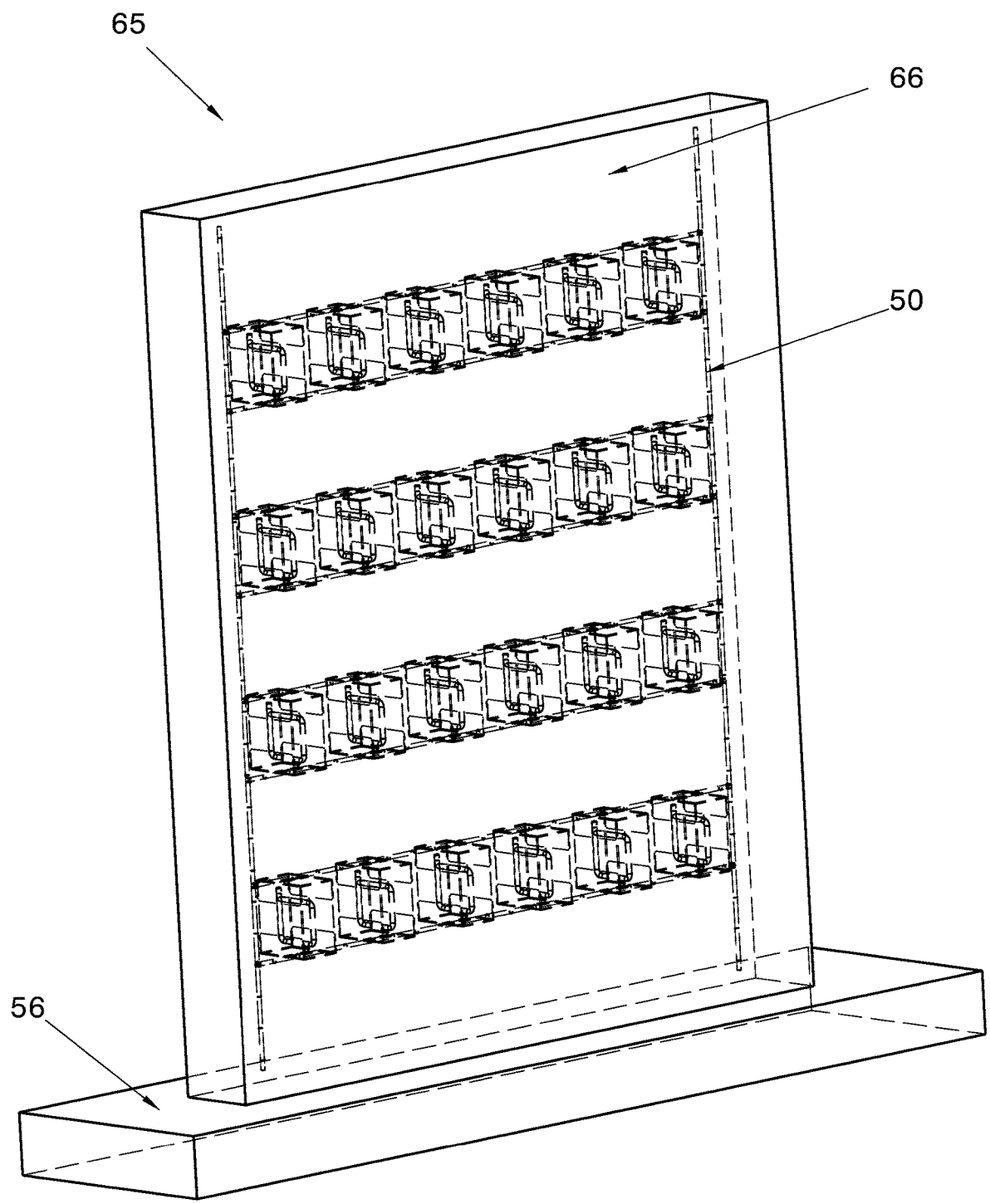
FIG. 11 is a drawing showing the poured and hardened concrete wall sitting on its foundation and containing the assembly of FIG. 9.

With reference to FIG. 11 the wall section, 65, results after the concrete has set and the form assembly shown in FIG. 10 is removed. The concrete, 66, encloses the loaded rack system, 50, and is attached to the foundation, 56. The heat transfer blocks, 25, can now transfer heat from the front face of the wall section, 65, to the rear face of the wall section, 65.

Figure 12:
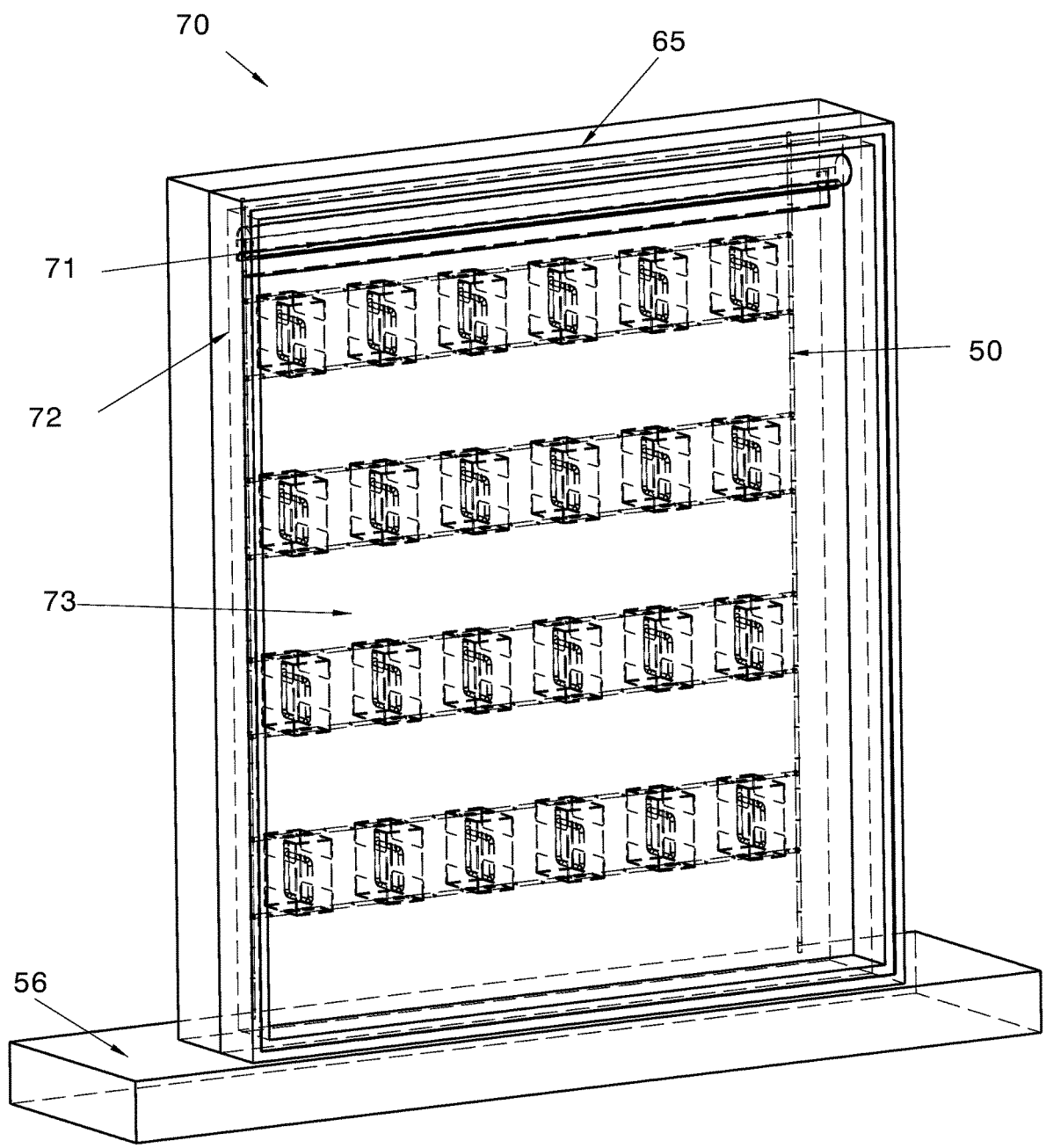
FIG. 12 is a drawing showing the concrete wall of FIG. 11 with a protective glazing cover mounted in front of it and having a motorized screen behind the protective glazing cover and in front of the concrete wall.

With reference to FIG. 12 the wall section, 65, is shown on the foundation, 56, along with the glazing frame, 72, and a protective glazing cover, 73, behind which is mounted a motorized roll-up screen, 71, which is shown in the up position in this view, 70. The protective glazing cover, 73, allows solar radiation to enter and fall on the wall section, 65, and prevents the escape of long wavelength light (infra-red). The motorized roll-up screen, 71, is in the raised position as shown in view, 70, when solar radiation is present to heat the wall section, 65.

Figure 13:
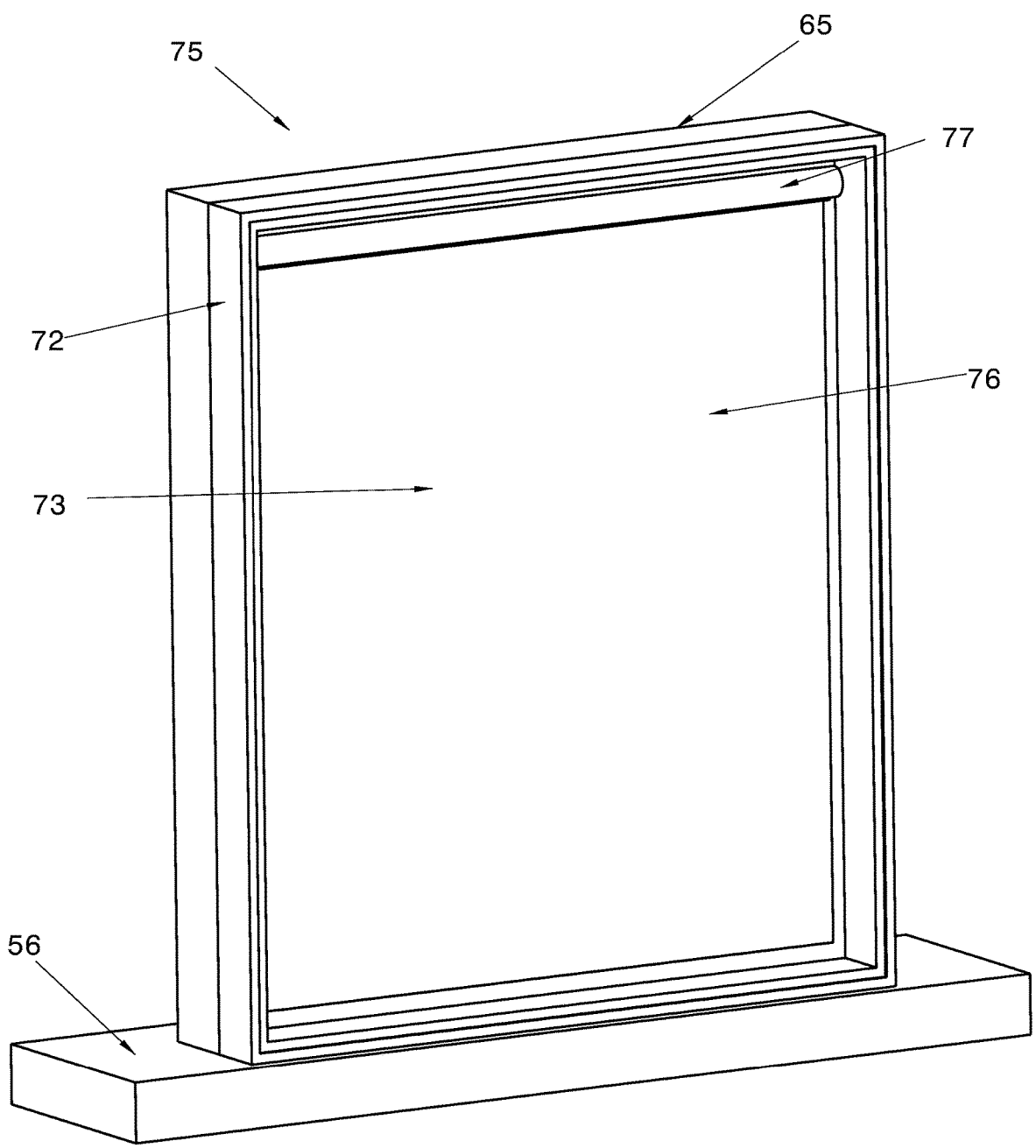
FIG. 13 is a drawing showing the assembly of FIG. 12 with the screen lowered to cover the concrete wall.

With reference to FIG. 13 the wall section, 65, is shown on the foundation, 56, along with the glazing frame, 72, and a protective glazing cover, 73, behind which is mounted a motorized roll-up screen, 77, which is shown in the down position in this view, 75. The protective glazing cover, 73, allows solar radiation to enter and fall on the wall section, 65, and prevents the escape of long wavelength light (infra-red). The motorized roll-up screen, 77, is in the down position as shown in view, 75, when solar radiation is not present to heat the wall section, 65. The motorized roll-up screen, 77, is down at night and on days or times when there is insufficient solar radiation available.

Figure 14:
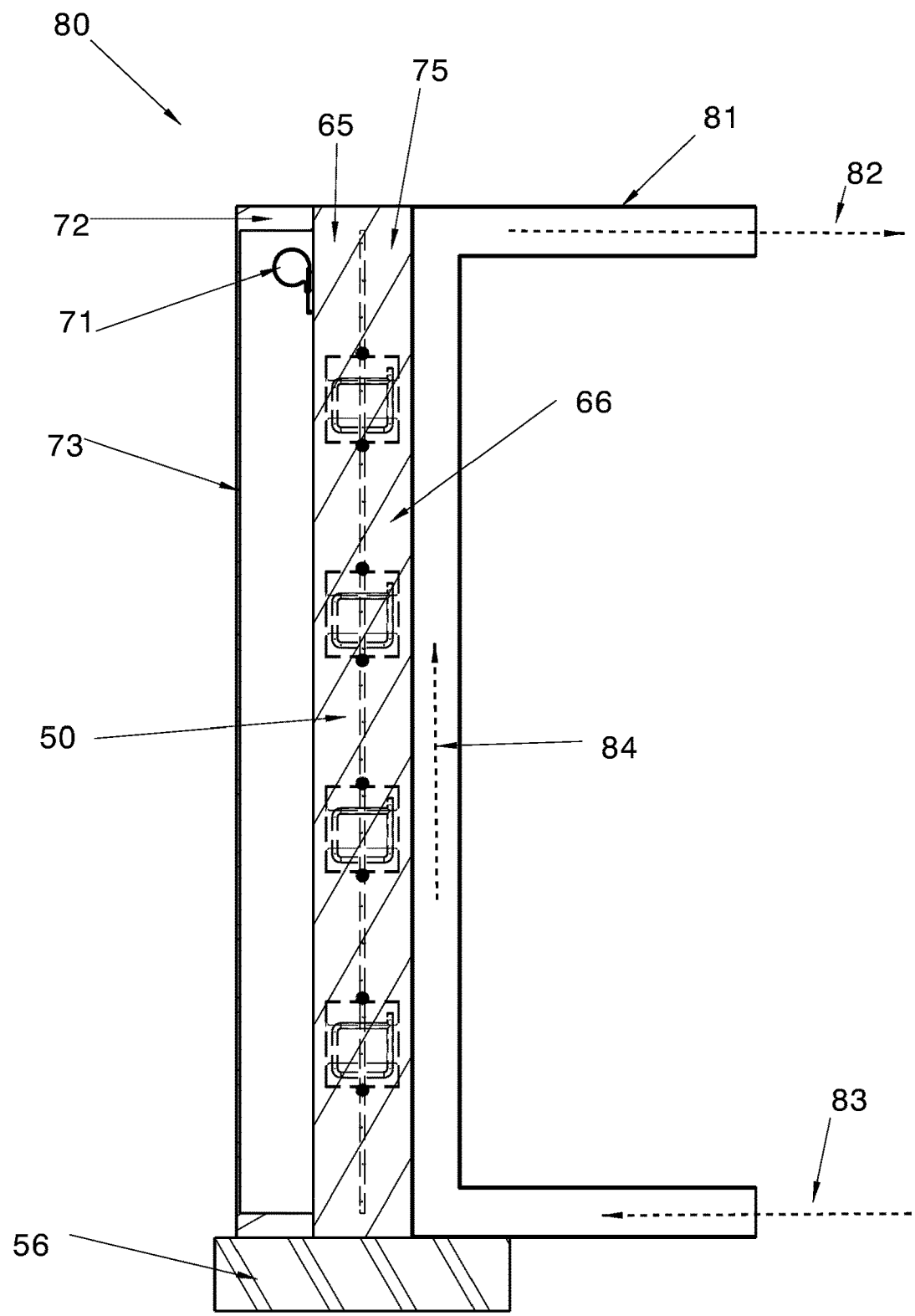
FIG. 14 is a drawing showing a cross section through the concrete wall of FIG. 12 with an air duct mounted on the back of the concrete wall.

FIG. 14 shows a cross section view, 80, through the wall section, 75, of FIG. 13. Visible in this view are: the wall section, 65, the concrete, 66, the loaded rack system, 50, the foundation, 56, along with the glazing frame, 72, and a protective glazing cover, 73, behind which is mounted a motorized roll-up screen, 71, which is shown in the up position, and the duct, 81, in this cross section view, 80. The duct, 81, has airflow, 83, coming from a fan (not shown), and then passes the airflow, 84, over the rear of the concrete, 66, in a vertical direction, then the heated airflow, 82, is sent off to a heat collection and storage system (not shown). Heat stored in the heat storage system, which could be stone rubble, a liquid, etc., for future use in heating.

Figure 15:
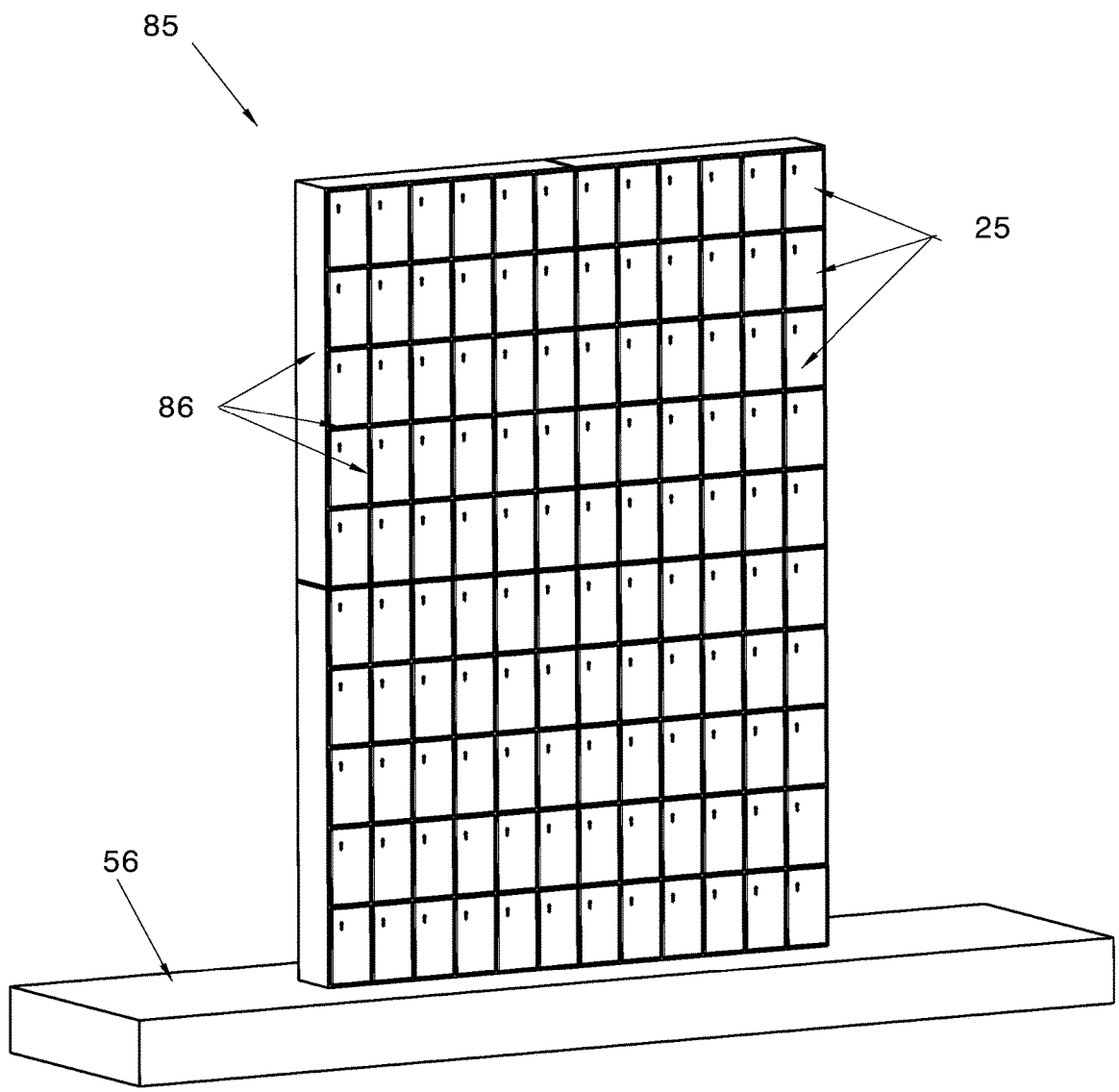
FIG. 15 is a drawing showing a heat absorbing wall made up of heat transfer blocks that are connected through the use of mortar, this is an alternative method for constructing the wall.

With reference to FIG. 15 an alternate method of constructing a wall section, 85, is shown. In this case the heat transfer blocks, 25, are held together by mortar, 86, to each other and to the foundation, 56, in the same fashion as a cinder block or brick wall is built. It is of course possible to replace some of the heat transfer blocks, 25, with inert blocks of the same dimension to lower the cost of constructing the wall section.

Figure 16:
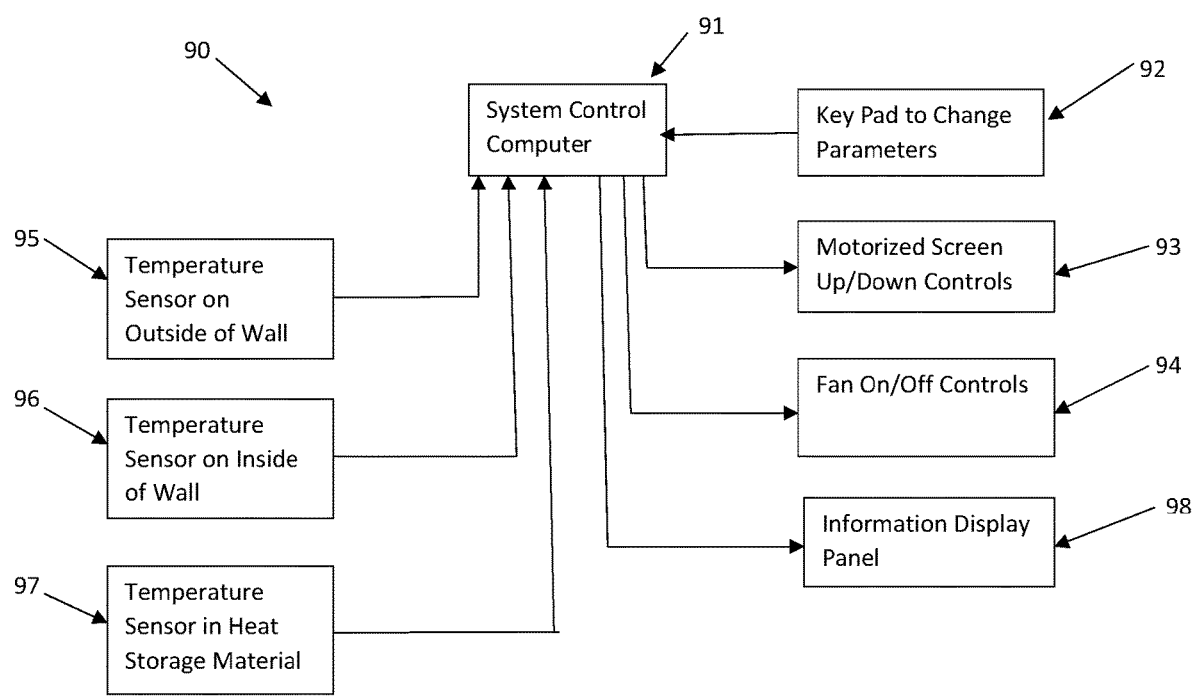
FIG. 16 is a drawing that shows a control system for the solar heat collection system.

With reference to FIG. 16 a control system, 90, is shown to control the operation of the solar heat collection system. The system control computer, 91, has the following inputs: key pad, 92, temperature sensor on outside of wall, 95, temperature sensor on inside of wall, 96, and temperature sensor in heat storage material, 97. The system control computer, 91, has the following outputs: information display panel, 98, motorized screen up/down signal, 93, and fan on/off signal, 94. The key pad, 92, can be used to enter information such as maximum heat storage material temperature, etc. The information display panel, 98, can display material storage temperature, outside wall temperature, inside wall temperature, fan on/off, motorized screen up/down, etc. Whenever the outside wall temperature is less than a preset temperature, the motorized screen will be lowered, and when the outside wall temperature is above that preset temperature, the motorized screen will be raised. Whenever the inside wall temperature is above the heat storage material temperature, the fan will be turned on, and whenever the inside wall temperature is below the heat material storage temperature, the fan will be turned off.

Figure 17:
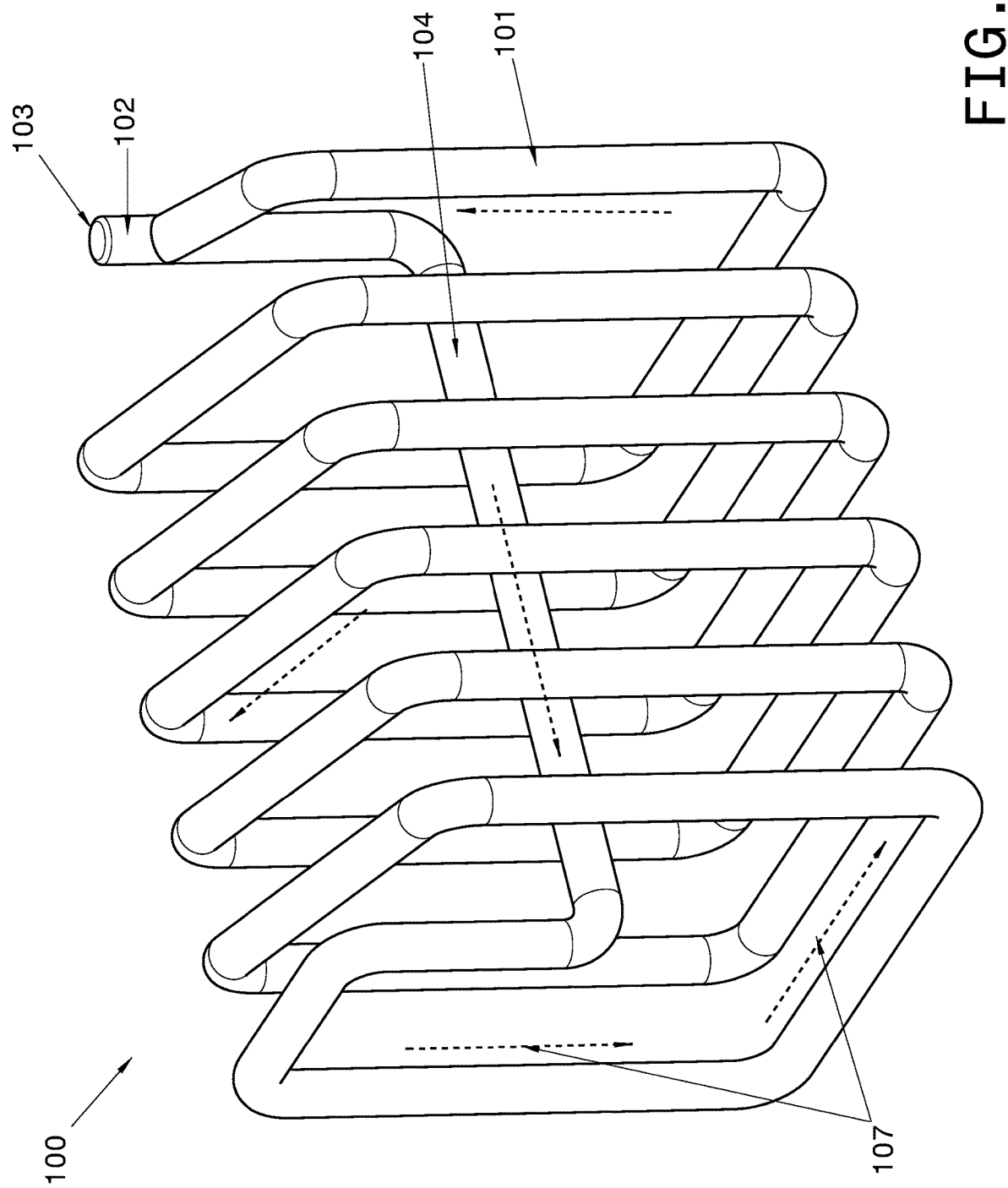
FIG. 17 is a drawing that shows a third embodiment of the heat transfer device.

With reference to FIG. 17, a third embodiment of a heat transfer device, 100, is shown. The major components are: a metal tube formed into a helical loop, 101, and a metal cap, 103. The heat transfer device, 100, is equipped with an expansion tube, 102, that allows for thermal expansion of the liquid inside the metal tube, 101. The direction of liquid movement inside the helical loop, 101, is shown by arrows, 107. The metal tube, 101, can be made from metals such as steel, aluminum, copper, brass, etc. Steel may be preferred as it has a thermal coefficient of expansion that is similar to concrete.

Figure 18:
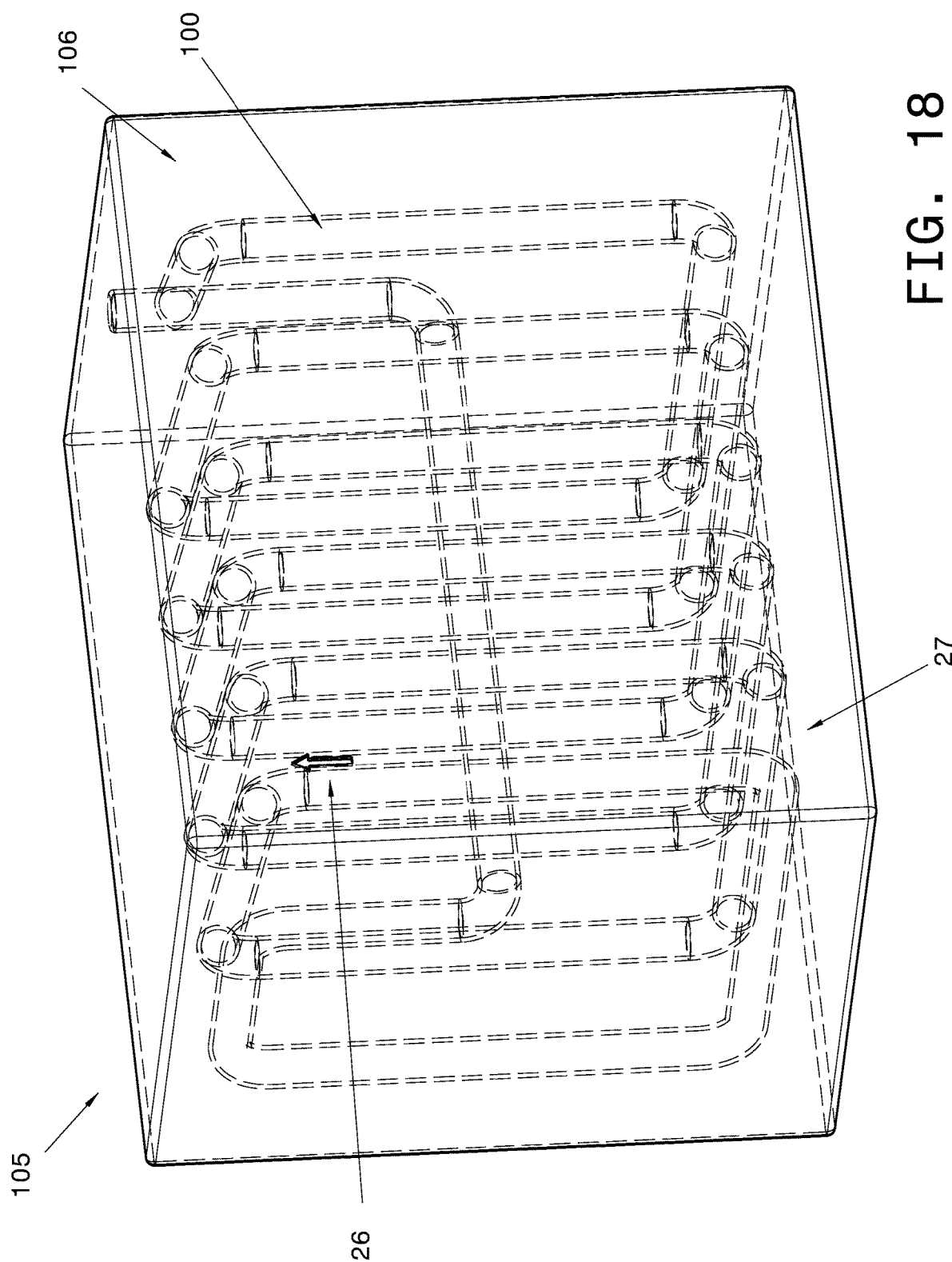
FIG. 18 is a drawing that shows the heat transfer device of FIG. 17 in a concrete block to create a heat transfer block.

With reference to FIG. 18, the heat transfer block, 105, is shown to contain a third embodiment of the heat transfer device, 100, cast inside a cast block, 106. The heat transfer block, 105, has an arrow, 26, embossed into its surface, 27. The purpose of this arrow, 26, is first to identify the surface that must be heated, while the direction of the arrow, 26, indicates the orientation of the heat transfer block, 105, for proper operation. The face, 27, is the face of the heat transfer block, 105, is the face that must be oriented to the heat source. The fact that the heat transfer device, 100, is formed into a helical coil will increase the amount of heat that the heat transfer block, 105, can transfer. The material of the heat transfer block, 28, is most likely concrete, however the concrete may be filled with heat transfer efficient materials, such as iron particles.

Figure 19:
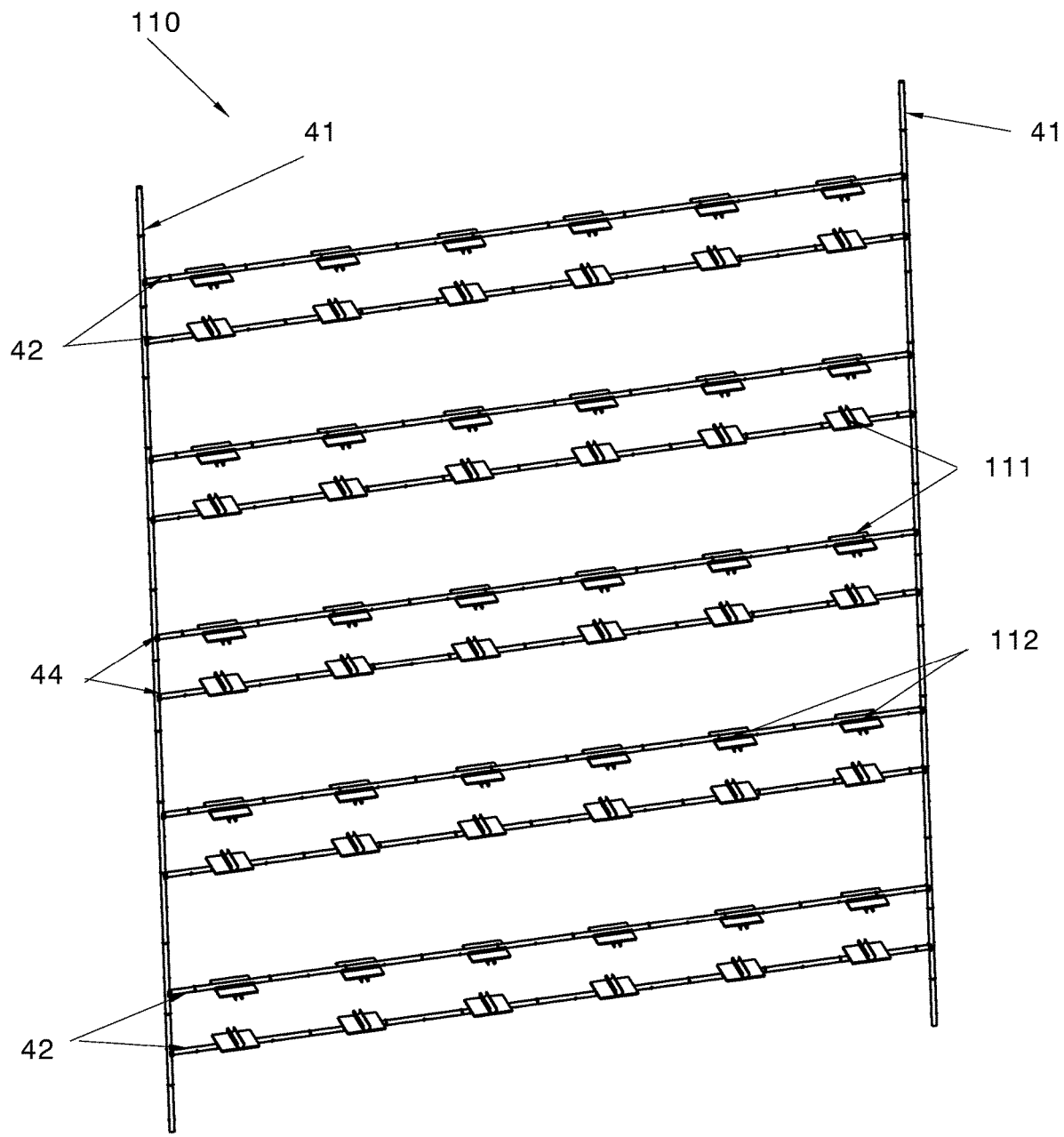
FIG. 19 is a drawing showing a rack designed to hold several heat transfer devices in fixed locations.

With reference to FIG. 19 a metal rack, 110, is shown, that is designed to hold the heat transfer devices, 15, in fixed positions. The metal rack is constructed from vertical re-bars, 41, and horizontal re-bars, 42, which are joined by welds, 44. The horizontal re-bars, 42, carry brackets, 111, that are attached to the horizontal re-bars, 42, by welds, 112. The arrangement of the brackets, 111, on the horizontal re-bars, 42, such that the spacing and alignment of the brackets, 111, allows the heat transfer devices, 15, to simply slip into place supported by the brackets, 111.

Figure 20:
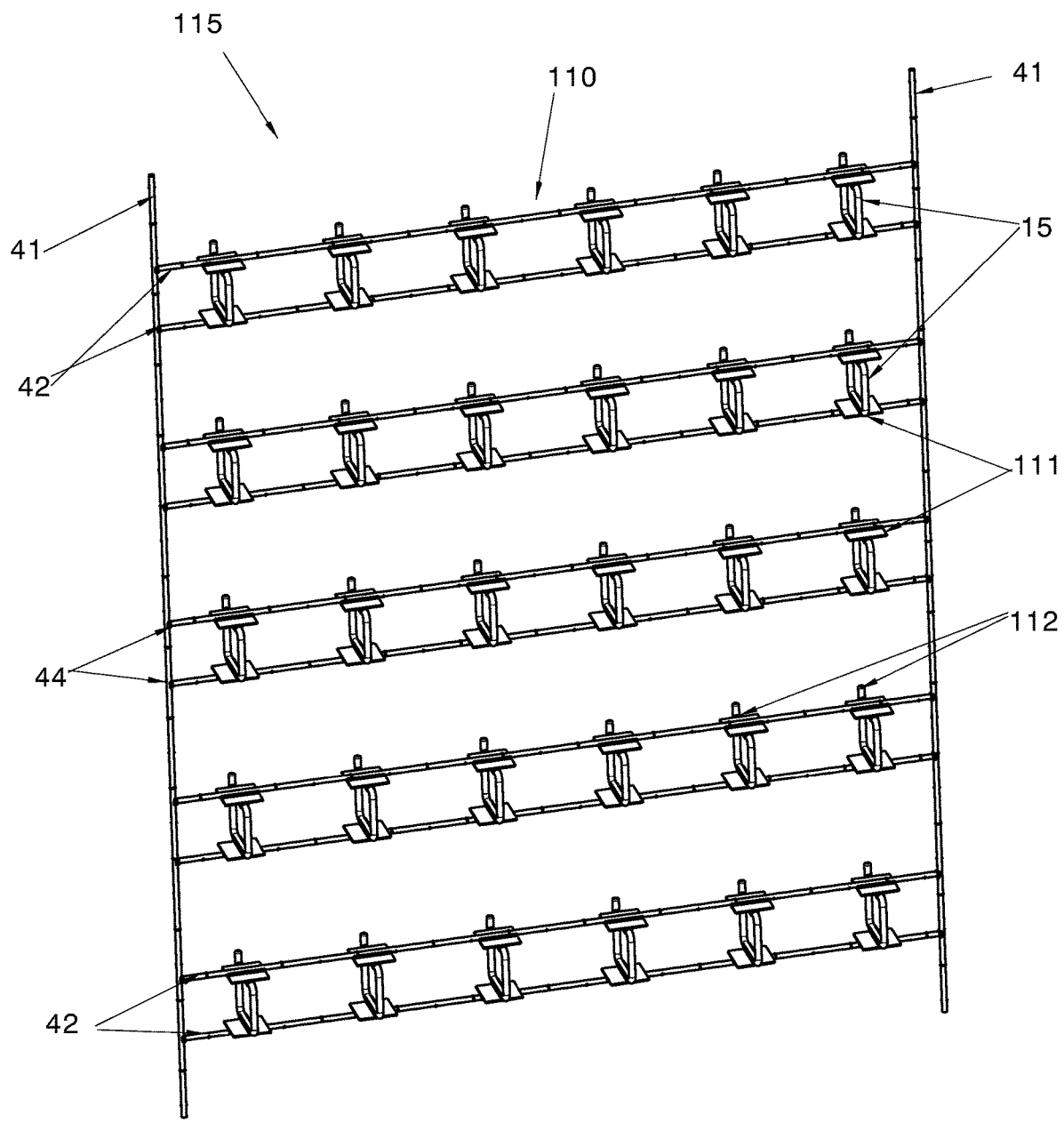
FIG. 20 is a drawing showing the rack of FIG. 19 holding several heat transfer devices in fixed locations.

FIG. 20 shows the rack, 110, loaded with heat transfer devices, 15, sitting on the brackets, 111, making up the loaded rack system, 115. Also shown are the vertical re-bars, 41, and horizontal re-bars, 42, which are joined by welds, 44. The horizontal re-bars, 42, carry brackets, 111, that are attached to the horizontal re-bars, 42, by welds, 112.

Figure 21:
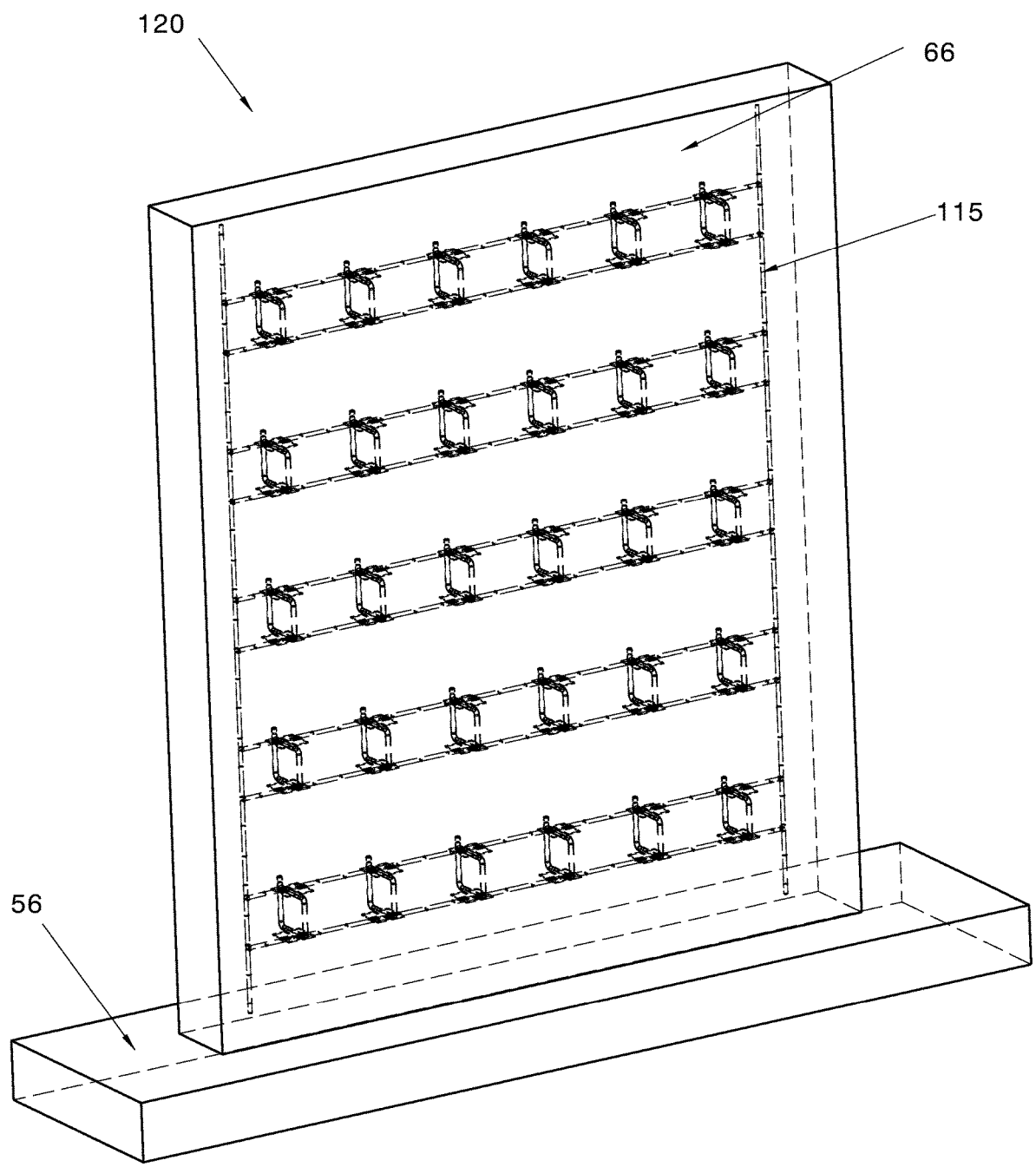
FIG. 21 is a drawing showing the poured and hardened concrete wall sitting on its foundation and containing the assembly of FIG. 20.

With reference to FIG. 21 the wall section, 120, results after the concrete has set and the form assembly shown in FIG. 10 is removed. The concrete, 66, encloses the loaded rack system, 115, and is attached to the foundation, 56. The heat transfer devices, 15, can now transfer heat from the front face of the wall section, 120, to the rear face of the wall section, 120.

Figure 22:
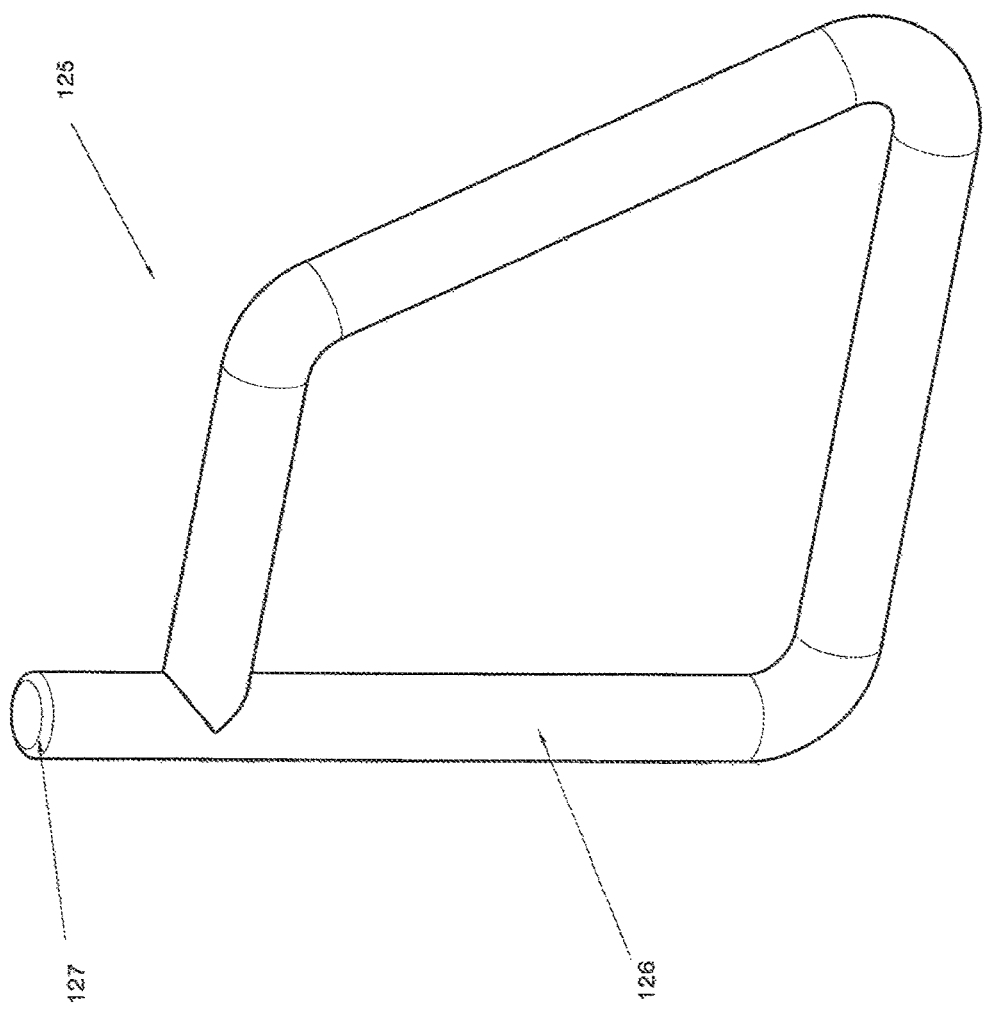
FIG. 22 is a drawing showing a fourth version of the heat transfer device.

With reference to FIG. 22, a fourth embodiment of a heat transfer device, 125, is shown. The major components are: a metal tube formed into a loop, 126, and a metal cap, 127. The metal tube, 126, can be made from metals such as steel, aluminum, copper, brass, etc. Steel may be preferred as it has a thermal coefficient of expansion that is similar to concrete. One portion of the metal tube is inclined to the vertical, allowing the heat transfer device, 125, to have the inclined portion sit at an optimum angle for receiving heat energy from the sun, based on the latitude at which the heat transfer device, 125, is to be used.

Figure 23:
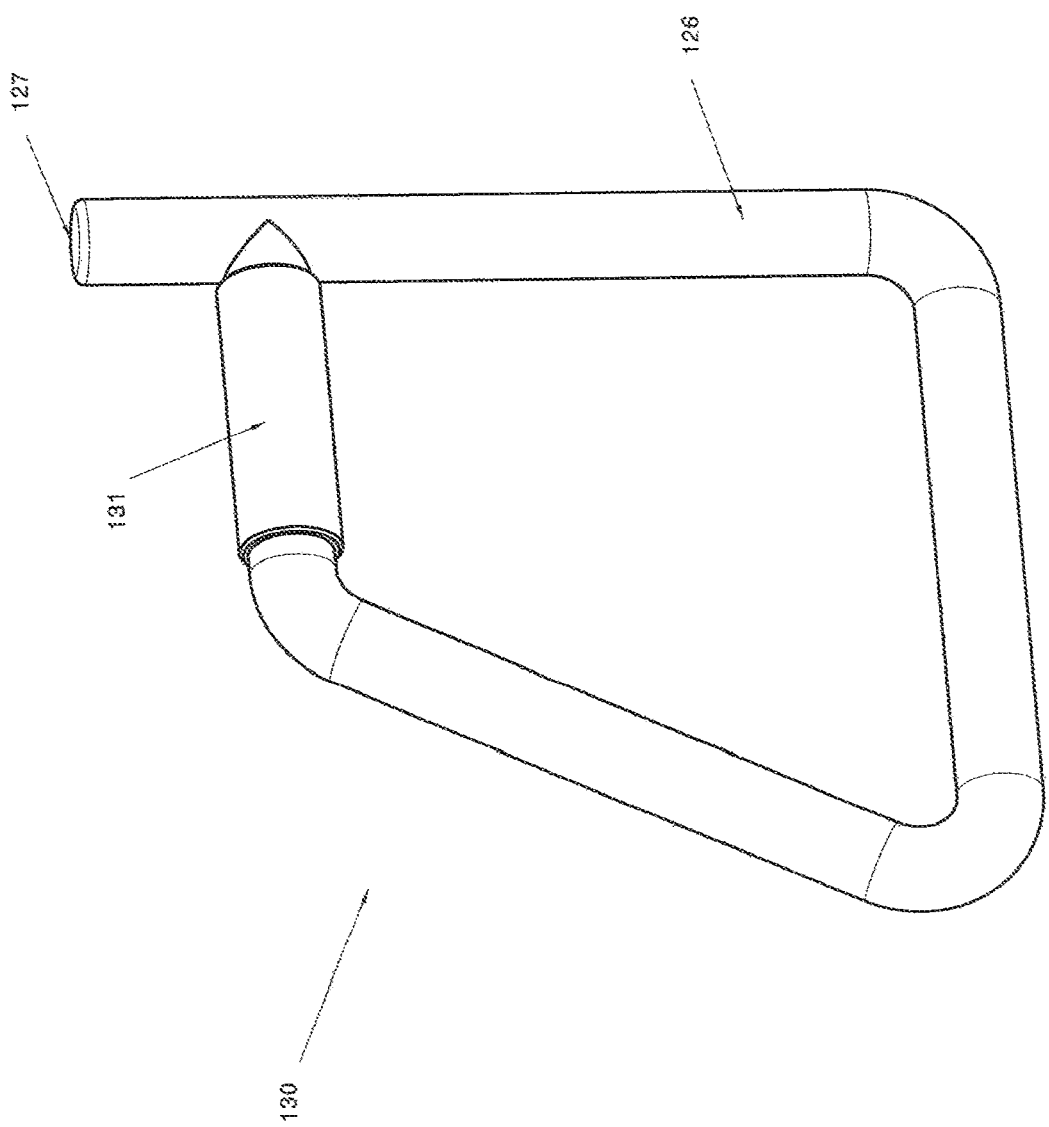
FIG. 23 is a drawing showing the fourth version of the heat transfer device from FIG. 22 with an insulation sleeve.

With reference to FIG. 23, the fourth embodiment of the heat transfer device of FIG. 22 with insulation sleeve, 131, is shown as heat transfer device, 130. The major components are: a metal tube formed into a loop, 126, a metal cap, 127, and the insulation sleeve, 131. The insulation sleeve, 131, can be made from various materials that are poor heat conductors, and are present to prevent any heat loss from the metal tube, 126, until the opposite vertical portion of the heat transfer device, 126, has been reached by the fluid inside the heat transfer device, 126.

Figure 24:
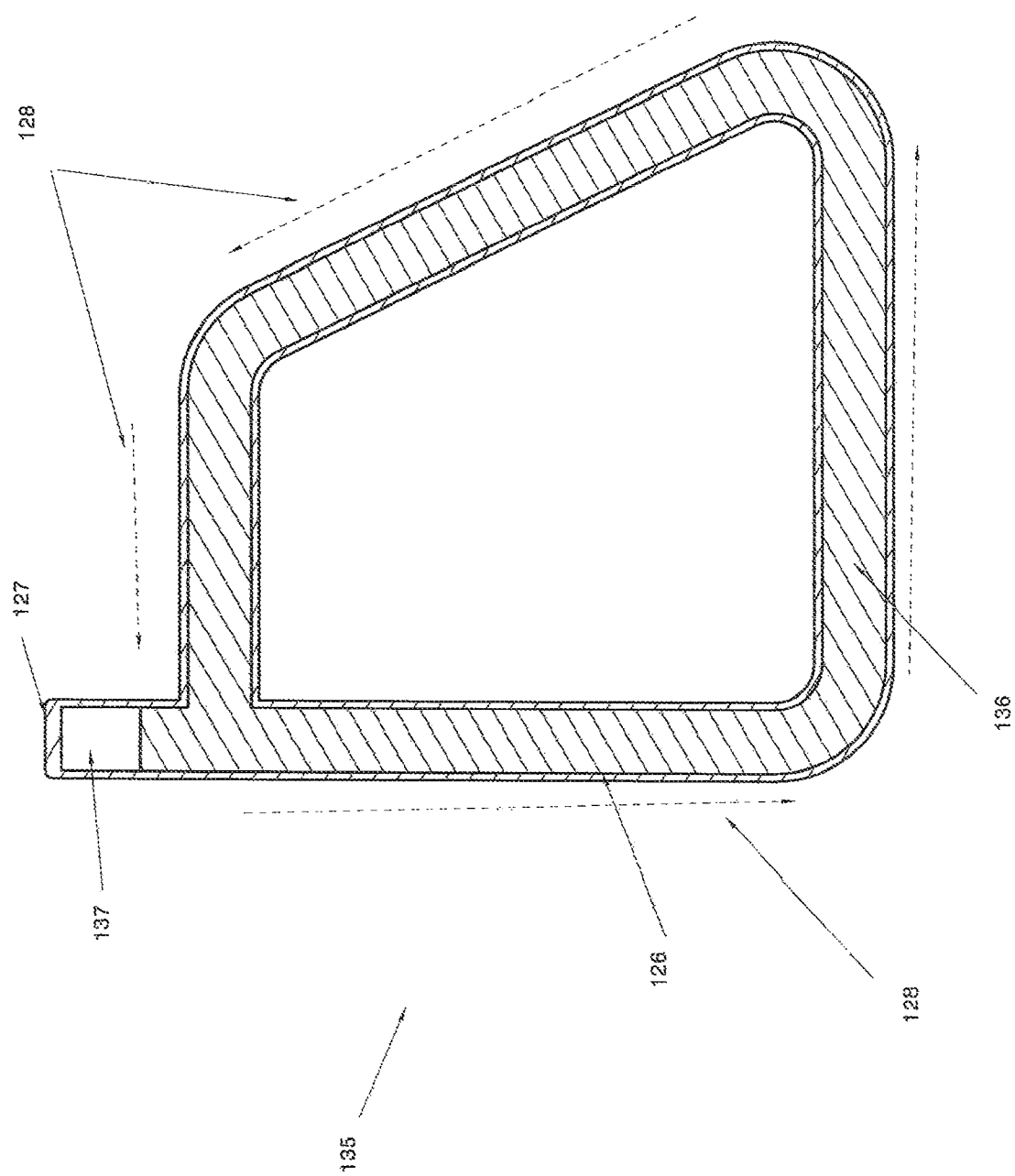
FIG. 24 is a drawing showing a cross section view through the heat transfer device of FIG. 22.

FIG. 24 shows a cross section view, 135, through the heat transfer device, 125, of FIG. 22. The components: a metal tube, 126, a metal cap, 127, also shown is the fluid, 136, that fills most of the metal tube, 126, leaving a void above the fluid, 137, that allows for expansion of the fluid, 136. The fluid may be any suitable fluid, 136, that can perform in a liquid state over the temperature range encountered during operation, which is estimated to range from −50° to +95° C. Suitable fluids, 136, include, water with antifreeze, alcohols, etc. Also shown in the figure are direction arrows, 126, showing the direction of movement of the fluid, 136, as it is heated.

Figure 25:
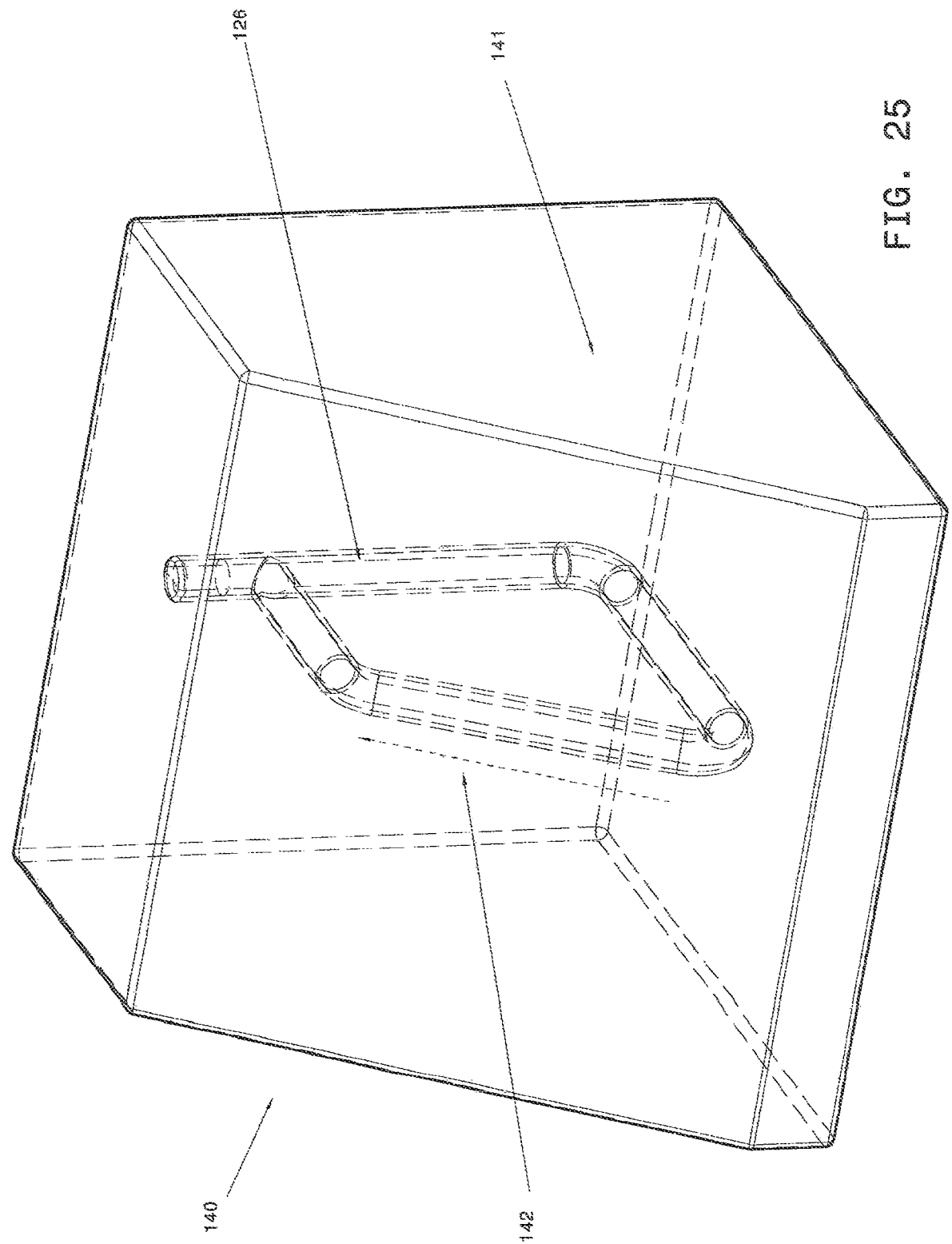
FIG. 25 is a drawing showing a heat transfer block that contains the heat transfer device of FIG. 22.

With reference to FIG. 25, the heat transfer block, 140, is shown to contain a fourth embodiment of the heat transfer device, 125. The angled face of the heat transfer block, 140, is the face that must be oriented towards the heat source. The material, 141, of the heat transfer block, 140, is most likely concrete, however the concrete may be filled with heat transfer efficient materials, such as iron particles. The direction of heat transfer is shown by arrow, 142.

Figure 26:
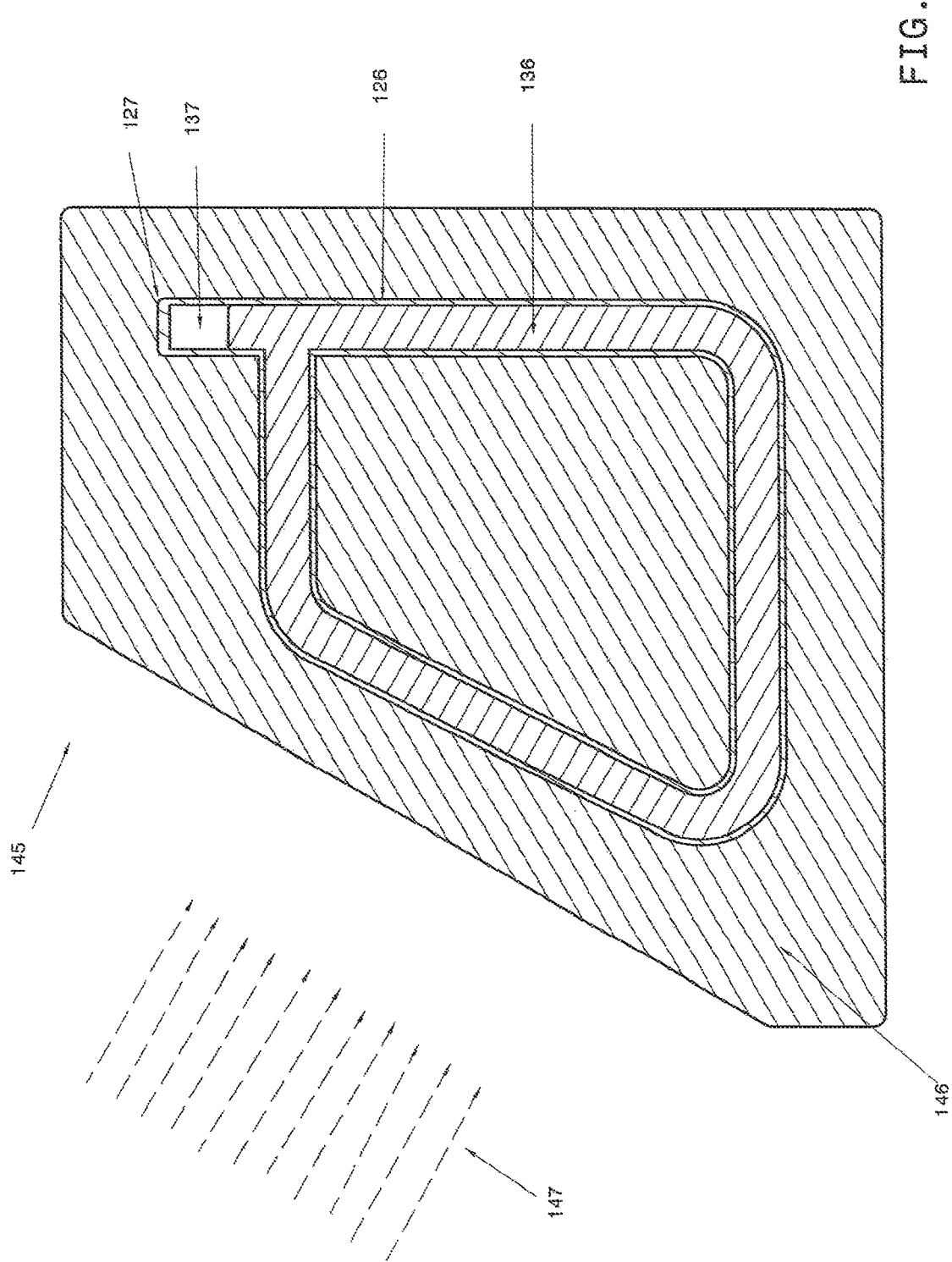
FIG. 26 is a drawing showing a cross section through a heat transfer block that contains the heat transfer device of FIG. 22.

FIG. 26 shows a cross section view, 145, thru the heat transfer block, 140, that has the heat transfer device, 125, of FIG. 22 embedded in it. Also shown in the view are the components: a metal tube, 126, a metal cap, 127, attached to the metal tube, 126, the void above the fluid, 137, and the fluid, 136. The average direction of the solar radiation, 147, falling on the sloped face of the heat transfer block, 145, is shown as being normal to the front face of the heat transfer block, 145, the angle of the sloped face of the heat transfer block is selected based on the latitude of the location of the wall and the angle of the sun during the winter months.

Figure 27:
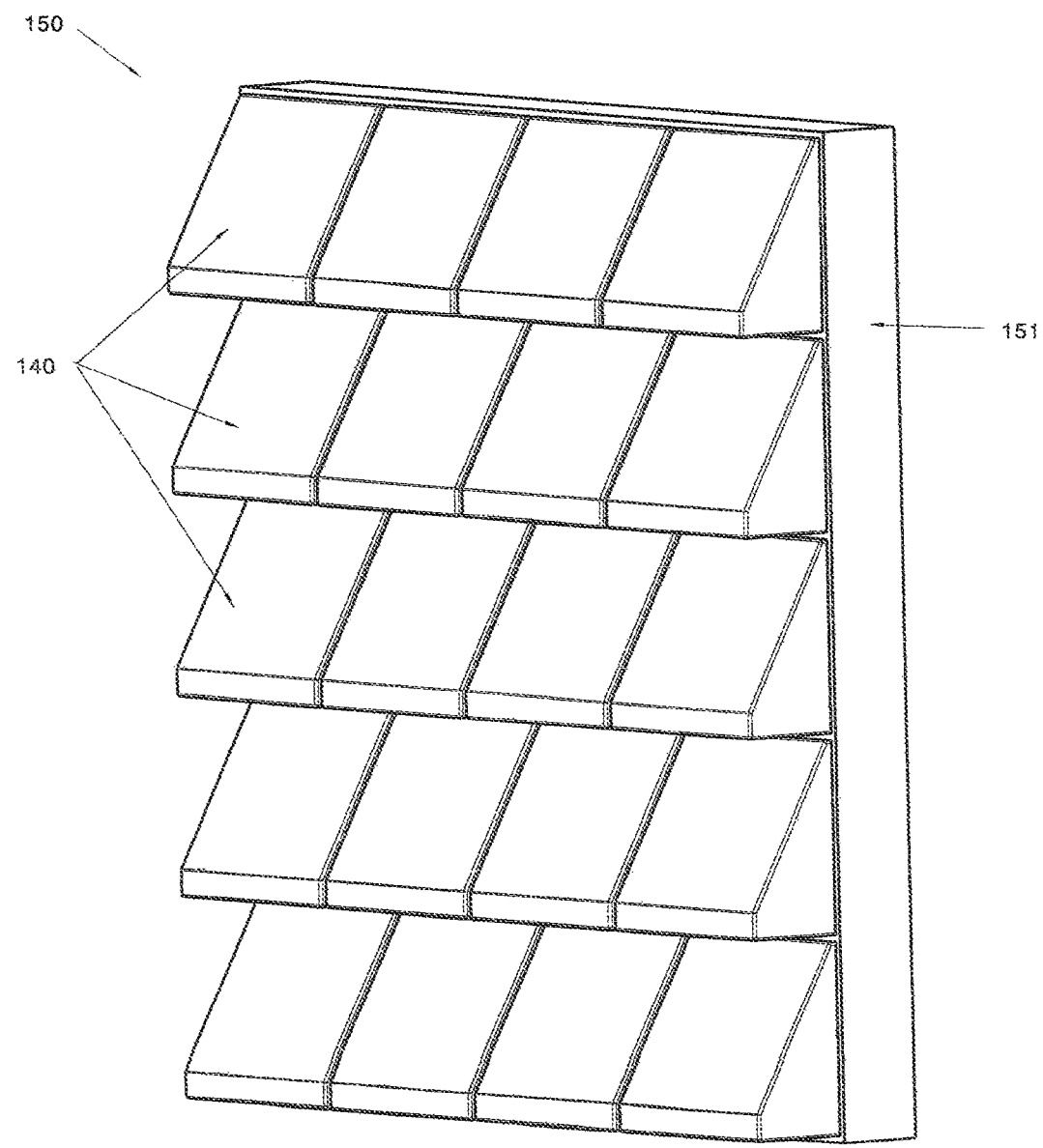
FIG. 27 is a drawing showing a block wall constructed using the heat transfer blocks of FIG. 25.

With reference to FIG. 27 an alternate method of constructing a wall section, 150, is shown. In this case the heat transfer blocks, 140, are held together by mortar, 151, in the same fashion as a cinder block or brick wall is built. It is of course possible to replace some of the heat transfer blocks, 140, with inert blocks of the same dimension to lower the cost of constructing the wall section.

Figure 28:
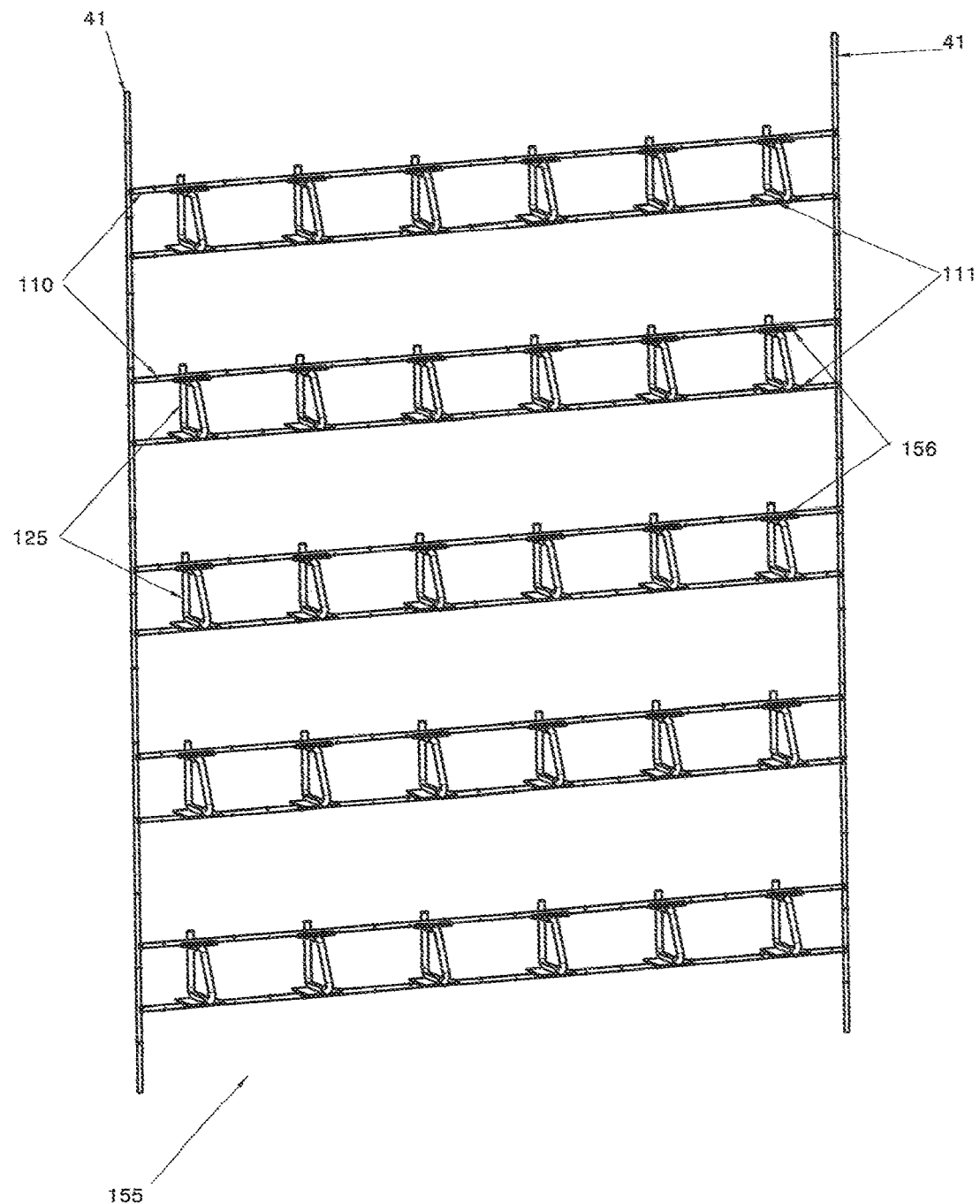
FIG. 28 is a drawing showing a rack made of metal rods holding several of the heat transfer devices shown in FIG. 22 in fixed locations.

FIG. 28 shows a rack, 155, loaded with heat transfer devices, 125, sitting on the brackets, 111, and 156, making up the loaded rack system, 155. Also shown are the vertical re-bars, 41, and horizontal re-bars, 110, which are joined by welds at their intersection points. The horizontal re-bars, 110, carry brackets, 111, and 156, that are attached to the horizontal re-bars, 110, by welds.

Figure 29:
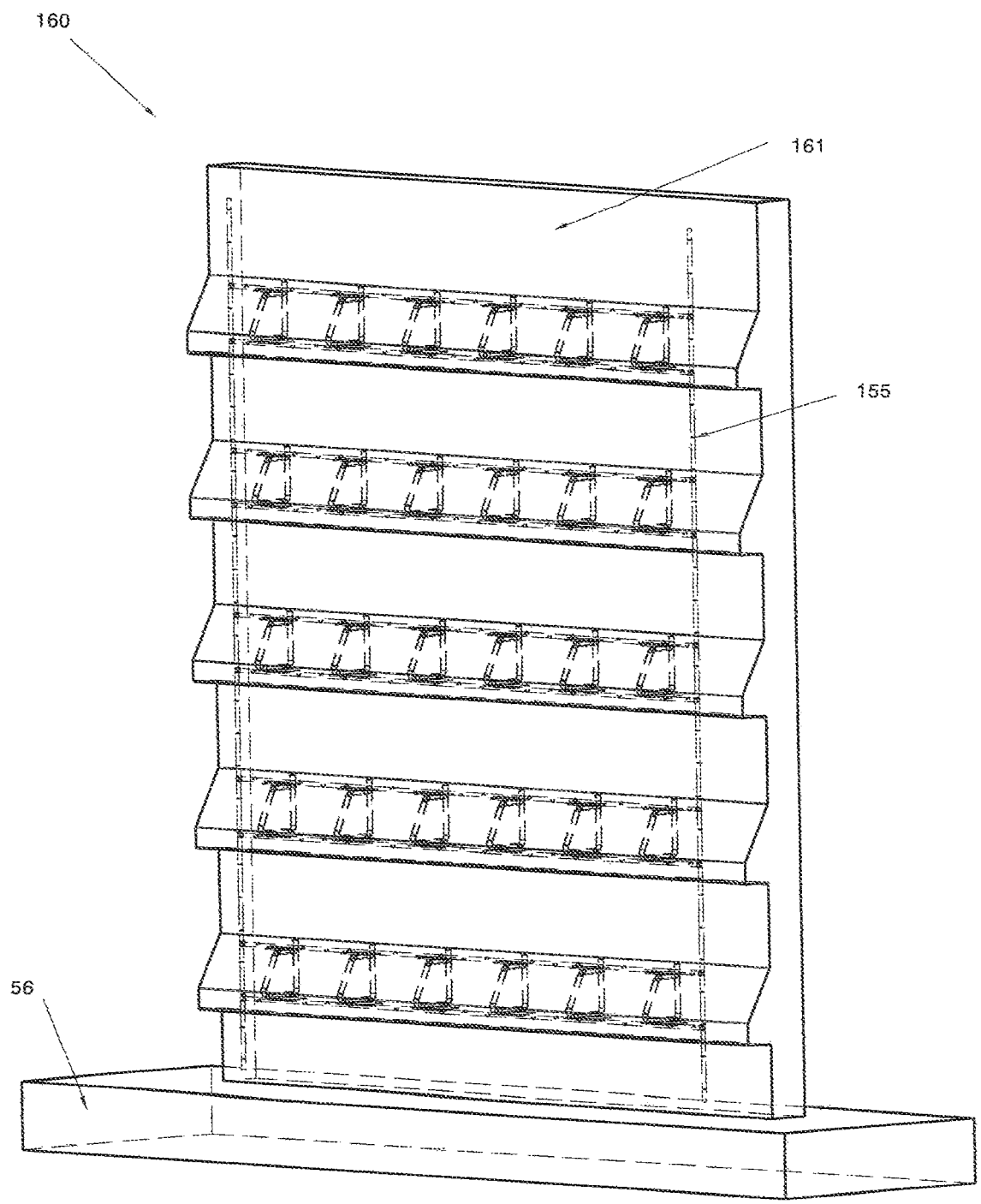
FIG. 29 is a drawing showing a poured and hardened concrete wall sitting on its foundation and containing the assembly of FIG. 28.

With reference to FIG. 29 the wall section, 160, results after concrete has been poured and set in a form that encloses the loaded rack, 155. The concrete, 161, encloses the loaded rack system, 155, and is attached to the foundation, 56. The heat transfer devices, 125, can now transfer heat from the front face of the wall section, 160, to the rear face of the wall section, 160.

This invention has been described with reference to detailed descriptions of preferred embodiments. The details of the descriptions are given for the sake of explanation only and are not intended as limitations upon the scope and spirit of the appended claims.

What is claimed is:

1. A heat transfer device to increase the efficiency and quantity of heat transferred through a concrete heated on one side by solar energy, the heat transfer device comprising:
   a) a continuous loop of tubing with at least two horizontal, one vertical, and one inclined sections; and
   b) a fluid that completely fills the continuous loop of tubing;
   c) a fluid expansion tubing portion connected to the continuous loop of tubing,
   d) the heat transfer device is encased in a heat transfer concrete block and a plurality of encased heat transfer devices forms a concrete wall; and
   e) a glass panel is placed in front of the concrete wall with a movable screen located behind the glass panel,
wherein heat is transferred by movement of the fluid in the continuous loop of tubing.

2. The building wall according to claim 1, further comprising a metal construct embedded in the concrete wall, wherein the construct holds the heat transfer devices in position when concrete forming the concrete wall is poured and during its hardening of the concrete wall.

3. The building wall according to claim 2, further comprising a surface of the concrete wall is cooled by moving air in a duct past the surface of the concrete wall and taking the air heated by the concrete wall to a heat storage location and storing the heat in a heat storage medium.

4. The building wall of claim 2, further compromising a computer control system for controlling the movement of the moveable screen and an on/off control of a fan that moves air past the back inner surface of the concrete wall, wherein the computer control system based on the relative temperatures of outer surface of the concrete wall, the inner surface of the concrete wall, and the heat storage medium.

5. A building wall constructed from the heat transfer blocks of claim 1, wherein the heat transfer blocks are held in place by mortar placed between the heat transfer blocks.

6. The building wall of claim 5, further comprising a glass panel in front of the concrete wall with a moveable screen located behind the glass panel.

7. The building wall according to claim 6, further comprising providing cooling an inner surface of the concrete wall by moving air in a duct past the inner surface of the concrete wall and taking the air heated by the concrete wall to a heat storage location and storing the heat in a heat storage medium.

8. The building wall of claim 7, further compromising a computer control system for controlling the movement of the moveable screen and an on/off control of a fan that moves air past the back inner surface of the concrete wall, wherein the computer control system based on the relative temperatures of outer surface of the concrete wall, the inner surface of the concrete wall, and the heat storage medium.

9. The heat transfer device of claim 1, further comprising a thin layer of insulating material covering one or more of the horizontal sections of the continuous loop of tubing.

* * * * *